(12) United States Patent
Birnbaum et al.

(10) Patent No.: US 8,638,301 B2
(45) Date of Patent: Jan. 28, 2014

(54) SYSTEMS AND METHODS FOR TRANSMITTING HAPTIC MESSAGES

(75) Inventors: David Birnbaum, Oakland, CA (US); Chris Ullrich, Ventura, CA (US); Peter Rubin, Berkeley, CA (US); Phong David Ngo, San Francisco, CA (US); Leo Kopelow, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 974 days.

(21) Appl. No.: 12/502,702

(22) Filed: Jul. 14, 2009

(65) Prior Publication Data

US 2010/0045619 A1      Feb. 25, 2010

Related U.S. Application Data

(60) Provisional application No. 61/080,978, filed on Jul. 15, 2008, provisional application No. 61/080,981, filed on Jul. 15, 2008, provisional application No. 61/080,985, filed on Jul. 15, 2008, provisional application No. 61/080,987, filed on Jul. 15, 2008, provisional application No. 61/148,312, filed on Jan. 29, 2009, provisional application No. 61/181,280, filed on May 26, 2009.

(51) Int. Cl.
  *G06F 3/041* (2006.01)
(52) U.S. Cl.
  USPC .......................................................... 345/173
(58) Field of Classification Search
  None
  See application file for complete search history.

(56) References Cited

U.S. PATENT DOCUMENTS

| | | |
|---|---|---|
| 4,873,623 A | 10/1989 | Lane et al. |
| 5,666,499 A | 9/1997 | Baudel et al. |
| 6,573,883 B1 * | 6/2003 | Bartlett ......................... 345/156 |
| 6,803,924 B1 | 10/2004 | Johnson et al. |
| 6,903,723 B1 | 6/2005 | Forest |
| 7,081,882 B2 | 7/2006 | Sowden et al. |
| 7,176,886 B2 | 2/2007 | Marvit et al. |
| 7,191,191 B2 | 3/2007 | Peurach et al. |
| 7,450,110 B2 | 11/2008 | Shahoian et al. |

(Continued)

FOREIGN PATENT DOCUMENTS

| | | |
|---|---|---|
| EP | 0 899 650 | 3/1999 |
| EP | 1 401 185 | 3/2004 |

(Continued)

OTHER PUBLICATIONS

Williamson, J. et al., Shoogle: Excitatory Multimodal Interaction on Mobile Devices, CHI 2007 Proceedings—Shake, Rattle and Roll: New Forms of Input and Output, 2007, pp. 121-124, XP002549378.

(Continued)

*Primary Examiner* — K. Wong
(74) *Attorney, Agent, or Firm* — Kilpatrick Townsend & Stockton LLP

(57) ABSTRACT

Systems and methods for transmitting haptic messages are disclosed. For example, one disclosed method includes the steps of: receiving at least one sensor signal from at least one sensor of a mobile device, the at least one sensor signal associated with a movement of the mobile device, determining a message to be displayed in a user interface based at least in part on the at least one sensor signal, and causing the message to be displayed.

31 Claims, 18 Drawing Sheets

(56) References Cited

U.S. PATENT DOCUMENTS

| | | | |
|---|---|---|---|
| 7,468,573 | B2 | 12/2008 | Dai et al. |
| 7,548,232 | B2 | 6/2009 | Shahoian et al. |
| 7,721,968 | B2 * | 5/2010 | Wigdor .................... 235/472.01 |
| 7,788,032 | B2 * | 8/2010 | Moloney ....................... 701/472 |
| 7,810,247 | B2 * | 10/2010 | Fourquin et al. ........... 33/366.11 |
| 8,123,614 | B2 * | 2/2012 | Kulas ............................. 463/31 |
| 8,306,576 | B2 * | 11/2012 | Cho et al. ...................... 455/567 |
| 2001/0035854 | A1 | 11/2001 | Rosenberg et al. |
| 2001/0045941 | A1 | 11/2001 | Rosenberg et al. |
| 2002/0177471 | A1 | 11/2002 | Kaaresoja et al. |
| 2003/0063128 | A1 | 4/2003 | Salmimaa et al. |
| 2003/0100969 | A1 | 5/2003 | Jones |
| 2003/0162595 | A1 | 8/2003 | Serbanescu |
| 2005/0052430 | A1 | 3/2005 | Shahoian et al. |
| 2005/0179617 | A1 | 8/2005 | Matsui et al. |
| 2005/0184696 | A1 | 8/2005 | Anastas et al. |
| 2005/0216867 | A1 | 9/2005 | Marvit et al. |
| 2006/0028453 | A1 | 2/2006 | Kawabe |
| 2006/0061545 | A1 | 3/2006 | Hughes et al. |
| 2006/0181510 | A1 | 8/2006 | Faith |
| 2006/0255683 | A1 | 11/2006 | Suzuki et al. |
| 2006/0256074 | A1 | 11/2006 | Krum et al. |
| 2006/0279476 | A1 | 12/2006 | Obata |
| 2006/0279542 | A1 | 12/2006 | Flack et al. |
| 2006/0284849 | A1 | 12/2006 | Grant et al. |
| 2007/0040810 | A1 | 2/2007 | Dowe et al. |
| 2007/0066283 | A1 | 3/2007 | Haar et al. |
| 2007/0139366 | A1 | 6/2007 | Dunko et al. |
| 2007/0152984 | A1 | 7/2007 | Ording et al. |
| 2007/0242056 | A1 | 10/2007 | Engelhardt et al. |
| 2007/0247442 | A1 | 10/2007 | Andre et al. |
| 2008/0020843 | A1 | 1/2008 | Wolinsky |
| 2008/0168403 | A1 | 7/2008 | Westerman et al. |
| 2008/0287147 | A1 | 11/2008 | Grant et al. |
| 2008/0300055 | A1 | 12/2008 | Lutnick et al. |
| 2009/0073118 | A1 | 3/2009 | Yamaji et al. |
| 2009/0100384 | A1 | 4/2009 | Louch |
| 2009/0167509 | A1 | 7/2009 | Fadell et al. |
| 2009/0167701 | A1 | 7/2009 | Ronkainen |
| 2009/0295743 | A1 | 12/2009 | Nakajoh |
| 2009/0309825 | A1 | 12/2009 | Sodergren et al. |
| 2010/0013777 | A1 | 1/2010 | Baudisch et al. |

FOREIGN PATENT DOCUMENTS

| | | |
|---|---|---|
| EP | 1 731 993 | 12/2006 |
| EP | 1728142 A2 | 12/2006 |
| FR | 2910160 | 6/2008 |
| GB | 2 416 962 | 2/2006 |
| JP | 05-100809 | 4/1993 |
| JP | 2005-152054 | 6/2005 |
| JP | 2007-531113 | 11/2007 |
| JP | 2007-531158 | 11/2007 |
| JP | 2007-535273 | 11/2007 |
| WO | WO 02/57885 A2 | 7/2002 |
| WO | WO 2004/044728 A2 | 5/2004 |
| WO | WO 2004/075169 A2 | 9/2004 |
| WO | WO 2005/103863 | 11/2005 |
| WO | WO 2005/112287 A1 | 11/2005 |
| WO | WO 2006/013363 A1 | 2/2006 |
| WO | WO 2008/132540 A1 | 11/2008 |
| WO | WO 2009/074185 A1 | 6/2009 |

OTHER PUBLICATIONS

Patent Cooperation Treaty, International Search Report, International Application No. PCT/US2009/050579, mailed Oct. 21, 2009.

Biet, M. et al., Discrimination of Virtual Square Gratings by Dynamic Touch on Friction Based Tactile Displays, Haptic Interfaces for Virtual Environment and Teleoperator Systems, 2008, Symposium, IEEE, Piscataway, NJ, XP 031339918, pp. 41-48, Mar. 2008.

Dewitt, A., Designing Sonification of User Data in Affective Interaction, Master of Science Thesis Stockholm, Sweden, XP 002551466, at hppt://w3.nada.kth.se/utbildning/grukth/exjobb/rapportlistor/2007/rapporter07/de_witt_anna_07142, as available via the Internet and printed Oct. 20, 2009.

Kaaresoja, T. et al., Snap-Crackle-Pop: Tactile Feedback for Mobile Touch Screens, Proceedings of the Eurohaptics 2006, XP 002551465, at http://lsc.univ-evry.fr/{eurohaptics/upload/cd/papers/f80, as available via the Internet and printed Oct. 20, 2009.

Oakley, I. et al., Contact IM: Exploring Asynchronous Touch over Distance, Palpable Machines Research Group, Media Lab Europe, XP 007910188, at http://people.cs.vt.edu/wangr06/touch%20review%20origization/Oak002, as available via the internet and printed Oct. 20, 2009.

Rovers, A. et al., HIM: A Framework for Haptic Instant Messaging, CHI 2004 (CHI Conference Proceedings. Human Factors in Computing Systems), XP 002464573, Vienna Austria, Apr. 2004, p. 1313-1316.

Sekiguchi, Y. et al., Haptic Interface using Estimation of Box Contents Metaphor, Proceedings of ICAT 2003, Tokyo, Japan, XP 002551467, at http://www.vrsj.org/ic-at/papers/2003/00947_00000, as available via the Internet and printed Oct. 20, 2009.

Patent Cooperation Treaty, International Search Report, International Application No. PCT/US2009/050587, mailed Oct. 29, 2009.

Patent Cooperation Treaty, International Search Report, International Application No. PCT/US2009/050574, mailed Oct. 29, 2009.

Patent Cooperation Treaty, International Search Report, International Application No. PCT/US2009/050564, mailed Oct. 28, 2009.

Patent Cooperation Treaty, Invitation to Pay Additional Fees, Application No. PCT/US2009/050569, mailed Nov. 9, 2009.

International Search Report and Written Opinion mailed Feb. 11, 2010 for corresponding International Application No. PCT/US2009/050569.

International Preliminary Report on Patentability mailed Jan. 27, 2011 for corresponding International Application No. PCT/US2009/050579.

Brown, L.M. and Williamson, J., "Shake2Talk: Multimodal Messaging for Interpersonal Communication," Oakley, I. and Brewster, S. (eds), HAID 2007, LNCS 4813, pp. 44-55.

Poupyrev, I. et al., "Ambient Touch: Designing Tactile Interfaces for Handheld Devices," {poup, rekimoto}@csl.sony.co.jp, shigeaki.maruyama@jp.sony.com http://www.csl.sony.co.jp/IL.

Smith, J. et al., "Communicating emotion through a haptic link: Design space and methodology," Int. J. Human-Computer Studes, 2007, 65:376-387.

Snibbe, S.S. et al., "Haptic Techniques for Media Control," Proceedings of 14th Annual ACM Symposium on User Interface Software and Technology, Orlando, Florida, Nov. 2001.

Verplank, B. et al., "The PLANK: Designing a simple haptic controller." Proceedings of the Conference on New Instruments for Musical Expression, Dublin, Ireland, May 24-26, 2012.

United States Patent and Trademark Office, Office Action, U.S. Appl. No. 12/502,755, mailed Apr. 25, 2012.

United States Patent and Trademark Office, Office Action, U.S. Appl. No. 12/502,647, mailed Dec. 12, 2011.

United States Patent and Trademark Office, Office Action, U.S. Appl. No. 12/502,795, mailed Mar. 6, 2012.

United States Patent and Trademark Office, Office Action, U.S. Appl. No. 12/502,795, mailed Oct. 5, 2011.

Office Action mailed Sep. 11, 2012 for corresponding U.S. Appl. No. 12/502,758.

Office Action mailed Sep. 26, 2012 for corresponding U.S. Appl. No. 12/697,030.

International Search Report and Writtten Opinion mailed Mar. 23, 2010 for corresponding International Patent Application PCT/US2010/022528.

International Preliminary Report on Patentability mailed Aug. 11, 2011 for corresponding International Patent Application PCT/US2010/022528.

International Preliminary Report on Patentability mailed Jan. 27, 2011 for corresponding International Patent Application PCT/US2009/050569.

International Preliminary Report on Patentability mailed Jan. 27, 2011 for corresponding International Patent Application PCT/US2009/050564.

(56) References Cited

OTHER PUBLICATIONS

International Preliminary Report on Patentability mailed Jan. 27, 2011 for corresponding International Patent Application PCT/US2009/050574.
International Preliminary Report on Patentability mailed Jan. 27, 2011 for corresponding International Patent Application PCT/US2009/050587.
Chinese Office Action dated Dec. 6, 2012 for corresponding Chinese Patent Application No. 200980127939.1.
Chinese Office Action dated Jan. 31, 2013 for corresponding Chinese Patent Application No. 200980128008.3.
Office Action dated Feb. 28, 2013 for corresponding U.S. Appl. No. 12/502,795.
Office Action dated Feb. 27, 2013 for corresponding U.S. Appl. No. 12/697,030.
Chinese Office Action dated Nov. 13, 2012 for corresponding Chinese Patent Application No. 200980127978.1.
Chinese Office Action dated Nov. 29, 2012 for corresponding Chinese Patent Application No. 200980127938.7.
United States Patent and Trademark Office, Office Action, U.S. Appl. No. 12/697,030, mailed Jun. 3, 2013.
Notice of Reasons for Rejection, Japanese Application No. 2011-518849, dated May 28, 2013.
Japanese Patent Office, Notice for Reasons of Rejection, Japanese Patent Application No. 2011-518849, dated May 28, 2013.
Office Action dated Oct. 14, 2013 for corresponding European Patent Application 09790406.4.
Office Action dated Oct. 14, 2013 for corresponding European Patent Application 09790403.1
Office Action dated Oct. 14, 2013 for corresponding European Patent Application 09790404.9
Anonymous: "CSCW 2002—Interactive Posters", Jun. 26, 2002, pp. 1-1, XP55082201, Retrieved from the Internet: URL:http://www.acm.org/conferences/cscw2002/cfp-posters.html (retrieved on Oct. 2, 2013.
Office Action dated Oct. 14, 2013 for corresponding European Patent Application 09790414.8.
Notice of Reasons for Rejection dated Aug. 20, 2013 for corresponding Japanese Patent Application 2011-518852.
Office Action dated Oct. 22, 2013 for corresponding Japanese Patent Application 2011-518856.
Office Action dated Oct. 17, 2013 for corresponding Chinese Patent Application 200980127923.0

* cited by examiner

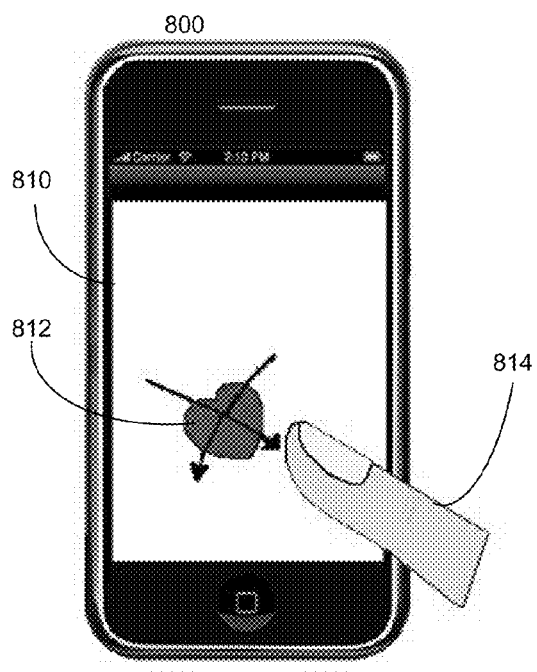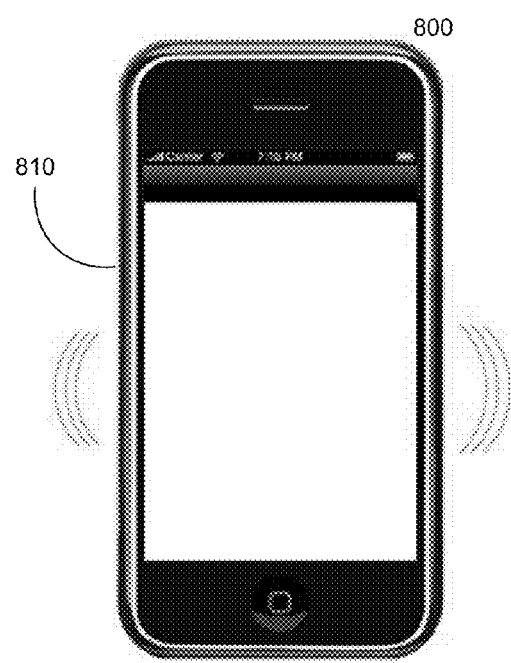
Figure 8a                    Figure 8b

SYSTEMS AND METHODS FOR TRANSMITTING HAPTIC MESSAGES

CROSS-REFERENCES TO RELATED APPLICATIONS

This utility patent application claims priority to: U.S. Provisional Patent Application No. 61/080,978, entitled "Systems and Methods for Physics-Based Tactile Messaging" filed Jul. 15, 2008; U.S. Provisional Patent Application No. 61/080,981, entitled "Systems and Methods for Mapping Message Contents to Virtual Physical Properties for Vibrotactile Messaging" filed Jul. 15, 2008; U.S. Provisional Patent Application No. 61/080,985, entitled "Systems and Methods for Shifting Sensor Haptic Feedback Function Between Passive and Active Modes" filed Jul. 15, 2008; U.S. Provisional Patent Application No. 61/080,987, entitled "Systems and Methods for Gesture Indication of Message Recipients" filed Jul. 15, 2008; U.S. Provisional Patent Application No. 61/148,312, entitled "Systems and Methods for Pseudo-Telepresence in a Shared Space" filed Jan. 29, 2009; and U.S. Provisional Patent Application No. 61/181,280, entitled "Systems and methods for Transmitting Haptic Messages" filed May 26, 2009 the entirety of all of which are hereby incorporated by reference.

FIELD OF THE INVENTION

The present invention generally relates to messaging systems and, more particularly, to systems and methods for transmitting haptic messages.

BACKGROUND

Conventional messaging systems may utilize a multi-step process for selecting a message recipient and sending a message. A user may be required to navigate several menus to select a recipient and send a message. Furthermore, no information about how the message is sent, such as how the send button was pressed, is preserved. Accordingly, there is a need for systems and methods for transmitting haptic messages.

SUMMARY

Embodiments of the present invention provide systems and methods for transmitting haptic messages. For example, one embodiment of the present invention is a method comprising: receiving at least one sensor signal from at least one sensor of a mobile device, the at least one sensor signal associated with a movement of the mobile device; determining a message to be displayed in a user interface based at least in part on the at least one sensor signal; and causing the message to be displayed. In another embodiment, a computer readable medium comprises processor-executable program code for carrying out such a method.

These illustrative embodiments are mentioned not to limit or define the invention but rather to provide examples to aid understanding thereof. Illustrative embodiments are discussed in the Detailed Description, where further description of the invention is provided. The advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein:

FIGS. 8a and 8b are illustrations of deleting haptic messages according to one embodiment of the present invention;

DETAILED DESCRIPTION

Figure 1:
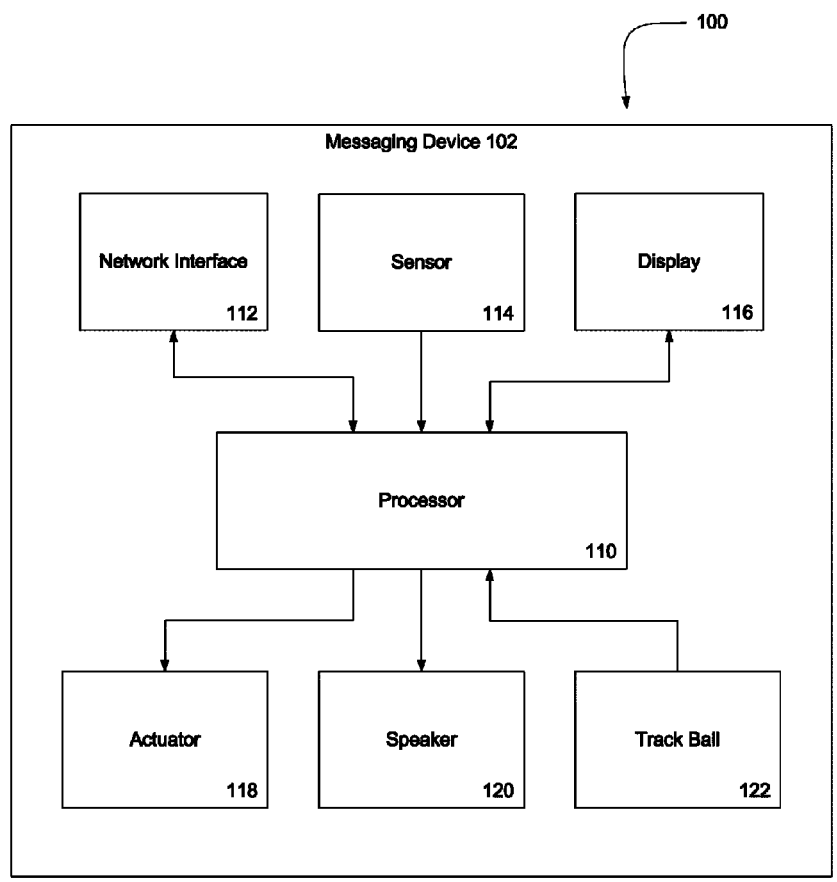
FIG. 1 is a block diagram of a system for transmitting haptic messages according to one embodiment of the present invention.

Embodiments of the present invention provide systems and methods for transmitting haptic messages.

Illustrative Embodiment of Transmitting Haptic Messages

One illustrative embodiment of the present invention comprises a mobile device such as a mobile phone. In the illustrative embodiment, the mobile device comprises the Samsung SGH-i710 mobile computer equipped with Immersion Corporation's VibeTonz® vibrotactile feedback system. In another embodiment, the messaging device comprises Immersion Corporations TouchSense® Technology system also known as Immersion TouchSense® vibrotactile feedback system. Other mobile devices and haptic feedback systems may be utilized.

The mobile device comprises a display, a user interface device, memory, and a processor in communication with each of these elements. The display comprises a touch-sensitive display, or a touch-screen. The illustrative mobile device also comprises a sensor and an actuator, both of which are in communication with the processor. The sensor is configured to sense a user's physical interaction with the mobile device, and the actuator is configured to output a haptic effect to the user.

In the illustrative embodiment, a multi-dimensional message inbox in the form of a virtual message environment is shown on the display. The virtual message environment contains electronic messages represented as virtual message objects. A message may be for example comprise text, data, pictures, video, or audio. A message may be displayed as a virtual message object which comprises the message. A virtual message object may take the form of: a scroll, a capsule, a ball, a balloon, or any other object that the display is capable of displaying. Each type of virtual message object may correspond to a specific type of message. For example, virtual message objects in the form of a tube or a cylindrical scroll may represent text messages or chat conversations. A short message intended to convey emotion, such as intimacy, may be represented as a virtual message object in the form of a heart. The virtual message environment also comprises a virtual gateway. Virtual message objects may enter or leave the virtual message environment through the virtual gateway.

In the illustrative embodiment, the virtual message object comprises a token. A token is a type of virtual message object that displays the same characteristics in both the sending and receiving mobile devices. Thus, when a virtual message object is sent from one mobile device to another, the virtual message object displays the same characteristics in the recipient device as it displayed in the sending device. The characteristics which are maintained may comprise the virtual message object's size, shape, color, and any haptic effect associated with the virtual message object. In some embodiments, a token may be a business token, a personal token, or some other type of token.

With the illustrative device, users can interact with the virtual message environment and/or virtual message objects by using the touch-screen and/or by manipulating the mobile device, for example, by rotating or shaking the device. Through such interactions, users can create, manipulate, send, and/or receive virtual message objects. In the illustrative device, a user makes a gesture directed toward the virtual gateway to transmit a virtual message object. Example gestures include: engaging the touch-screen and dragging or flicking a virtual message object toward a virtual gateway, tilting the mobile device in the direction of the virtual gateway, or shaking the virtual mobile device.

The sensor detects the user's gesture and, based on this gesture, sends a sensor signal to the processor. The sensor may comprise: a gyroscope, an accelerometer, a GPS, or other sensors capable of detecting movement, orientation, or location of the mobile device. The sensor may be configured to detect when a user moves or tilts the device. Based at least in part on the sensor signal, the processor determines a virtual force to apply to the virtual message object. For example, when the device is tilted, the processor may determine a virtual force representing gravity, and move the virtual message object in the direction the device is tilted. As another example, a sensor may detect that the device has been jabbed or thrust toward a virtual gateway. The sensor will then send a corresponding signal to the processor, which may determine a virtual force and apply it to the virtual message object.

After receiving a sensor signal, the processor determines a transmission characteristic of a virtual message object based, at least in part, on the sensor signal. In the illustrative embodiment, a transmission characteristic comprises a characteristic or property associated with the user's gesture or how the virtual message object was sent through the virtual gateway. This transmission characteristic is preserved and may be included as a part of the message. In one example, a user sends an urgent message by forcefully pushing the virtual message object through the virtual gateway. The transmission characteristic of the virtual message object will comprise its velocity as it passes through the virtual gateway. In another example, after a user slowly drags or flicks a virtual message object toward the virtual gateway, the processor determines a slow transmission characteristic. Additionally, the processor may determine other transmission characteristics based on the sensor signal, such as an approach angle transmission characteristic based on the angle of the user's gesture. The processor then includes the virtual transmission characteristic as a part of the virtual message object. In some embodiments, the processor may further include a determined haptic effect.

Next, the processor determines whether to transmit the virtual message object based, at least in part, on the virtual force. This determination may include a calculation of whether the gesture was sufficiently directed toward the virtual gateway. If a gesture is not directed toward the virtual gateway, the processor may determine that the virtual message object should not be transmitted, but rather it should stay inside the local virtual message environment. If the gesture is sufficiently directed toward the virtual gateway, the processor will determine that the virtual message object should be transmitted.

Finally, the processor transmits the virtual message object, as well as the transmission characteristic. The processor may send the virtual message object and the transmission characteristic to a network interface, such as a cellular network interface or a Wi-Fi network interface. The network interface then transmits the virtual message object and the transmission characteristic over a network, such as a cellular network, intranet, or the Internet, to another mobile device.

In another embodiment of the illustrative device, virtual message objects are transmitted to the recipient device at substantially real time. For example, a user may create a virtual message object on the sending device, and at substantially the same time the same virtual message object may appear on the recipient device. In this embodiment, the sender may manipulate characteristics of the virtual message object and those modifications may appear at substantially the same time on the recipient device. For example, a user may modify the color or haptic effect associated with a virtual message object on the sending mobile device, and at the same time, the virtual message object may be modified on the recipient device's screen. Thus, a virtual message object may form a direct real-time connection between two mobile devices. In this embodiment, signals associated with virtual message objects are sent, even though the user has not used a send function, or moved the virtual message object through the virtual gateway.

When the illustrative device receives a virtual message object, its transmission characteristic may be preserved and interpreted by the receiving mobile device. In the illustrative embodiment, the user's indicative gesture comprises a fast flick toward the virtual gateway. A fast transmission characteristic is determined by the processor and transmitted along with the virtual message object. Then, when the illustrative device receives the virtual message object, it displays the virtual message object entering its graphical user interface through a virtual gateway. The virtual message travels through the receiving device's virtual gateway with a velocity and haptic effect corresponding to its transmission characteristic. In the illustrative embodiment, a user sent the message with a fast flick, thus the receiving device's processor will determine a strong haptic effect, such as a heavy thud or a bounce. The processor may further determine a violent collision inside the virtual message environment when the virtual message object enters. In an alternative embodiment, if a user sent the virtual message object with a gentle thrust or tilt, the virtual message object may arrive at a slower speed accompanied by a gentle haptic effect, such as a soft vibration.

This illustrative example is given to introduce the reader to the general subject matter discussed herein; the invention is not limited to this example. The following sections describe various additional embodiments and examples of methods and systems for transmitting haptic messages.

Transmitting Haptic Messages

Embodiments of the invention presented herein provide systems and methods for transmitting haptic messages. By incorporating a physical model into a virtual message environment, embodiments can leverage a user's everyday tactile experience and motor-sensory skills to intuitively navigate the user interface in order to control the transmission of messages. Conventional messaging systems may provide little or no intuitive gesture navigation. Text messaging systems using a conventional email metaphor, with a one-dimensional inbox showing subject lines, drafts, etc., may be visually and cognitively intensive, requiring a user's heightened attention for creating, sending, and receiving messages. Further, conventional messaging systems may retain little or no contextual information associated with how the message was sent. Transmitting messages haptically, however, can facilitate non-linguistic communication of content by tying physical effects to a message.

In one embodiment, the mobile device's graphical user interface displays a virtual message environment. This virtual message environment incorporates a physical model, which allows users to directly manipulate its contents. The virtual message environment comprises electronic messages which are displayed as virtual message objects. A virtual message object may take the form of a ball, a scroll, a capsule, an arrow, a heart, or other shapes. Users can manipulate virtual message objects and the virtual message environment through motions or gestures detected by various sensors. These sensors may comprise one or more of a gyroscope, GPS, accelerometer, touch-screen, or other sensors configured to detect motion. The user's gestures or movements are translated into virtual forces acting on virtual message objects. These forces may cause the virtual message objects to move and collide inside the virtual message environment or to exit the environment through a virtual gateway.

Further, using a physical modeling engine, virtual boundaries may be programmed to correspond to the physical boundaries of the screen of the device. In such an environment, a virtual message object can bounce against the boundaries of the virtual message environment without traveling off the screen. A virtual gateway in the environment may be created by replacing part of the virtual physical boundary with a gateway or portal to one or more recipients. When a virtual object moves through the virtual gateway, it is transmitted to one or more recipient devices, and "leaves" the host's virtual message environment. Additionally, the virtual gateway may be closed, disabling the ability to send messages and keeping unsent messages in the virtual message environment. Thus, embodiments of the present invention may utilize a spatial metaphor for sending messages, thereby facilitating a more intuitive messaging process.

In some embodiments, a user may move a virtual message object through the virtual gateway by making an indicative gesture toward the virtual gateway. The gesture may be made by contacting the virtual message object on the touch-screen, moving the entire mobile device, or through some other means. In one example, a user sends a virtual message object by selecting it on the touch-screen and using a flicking gesture to move the object toward the virtual gateway. The processor may determine a transmission characteristic, such as the speed of the virtual message object as it travels through the virtual gateway. The transmission characteristic may be preserved as the virtual message object is transmitted to another mobile device. When the virtual message object is received by a recipient device, it may arrive in the virtual message environment and behave or interact with other objects and/or the environment based, at least in part, on its transmission characteristic.

In other embodiments, the virtual message environment itself may comprise a virtual gateway to the recipient device. For example, when a virtual message object is created in a sending virtual message environment, it may appear substantially simultaneously in the recipient virtual message environment. In another embodiment, if a user modifies a virtual message object by adding text or a haptic effect to the virtual message object, these changes may take place substantially simultaneously in the receiving virtual message environment.

Illustrative Systems for Transmitting Haptic Messages

In reference to the drawings in which like numerals indicate like elements throughout the several figures, FIG. 1 is a block diagram of a system for transmitting haptic messages according to one embodiment of the present invention. As shown in FIG. 1, the system 100 comprises a mobile device 102, such as a mobile phone, portable digital assistant (PDA), portable media player, or portable gaming device. The mobile device 102 comprises a processor 110 in communication with a network interface 112, a sensor 114, a display 116, an actuator 118, a speaker 120, and a track ball 122.

The processor 110 is configured to generate a graphical user interface which is shown on display 116. Processor 110 is in communication with network interface 112, which may comprise one or more methods of mobile communication, such as infrared, radio, Wi-Fi, or cellular network communication. In other variations, network interface 112 comprises a wired network interface, such as Ethernet. The mobile device 102 can be configured to exchange messages or virtual message objects with other devices (not shown in FIG. 1) via network interface 112. Embodiments of messages exchanged between devices may comprise voice messages, text messages, data messages, or other types of messages.

The processor 110 is also in communication with one or more sensors 114. Sensor 114 may comprise a position sensor, location sensor, rotational velocity sensor, image sensor, pressure sensor, or another type of sensor. For example, sensor 114 may comprise an accelerometer, a gyroscope, a GPS sensor, a touch-sensitive input device (e.g. touch screen, touch-pad), or some other type of sensor. The one or more sensors 114 may be configured to detect changes in, for example, acceleration, inclination, inertia, or location. For example, the mobile device 102 may comprise an accelerometer 114 configured to measure the acceleration of the mobile device 102. The one or more sensors 114 are configured to detect a user interaction and send a signal representing the user interaction to processor 110. The mobile device 102 may comprise additional forms of input, such as track ball 122, buttons, keys, a scroll wheel, and/or a joystick (not shown in FIG. 1).

Users may interact with the user interface through movements or gestures, the one or more sensors 114 detect these movements. As the user tilts, shakes, thrusts, or otherwise moves mobile device 102, the one or more sensors 114 detect these movements. The sensors 114 generate sensor signals based, at least in part, on these movements and send those signals to processor 110. The signals may comprise one or more of: angle of the movement, speed of the movement, distance covered by the movement, or X-Y orientation of the movement. In one embodiment, an accelerometer sensor is configured to detect the inclination and acceleration of the mobile device 102. As the mobile device 102 is tilted, an accelerometer can be configured to send signals to the processor 110 based, at least in part, on the tilt and/or acceleration of the mobile device 102.

Signals received from the sensor 114 may be associated with an interaction with the graphical user interface shown on display 116. In one embodiment, a sensor signal comprises an indicative gesture oriented toward a virtual gateway in a virtual message environment. For example, an indicative gesture may comprise a poking motion which moves the mobile device 102 in a certain direction. An accelerometer 114 may detect the poking motion and send a sensor signal to the processor 110 representing the motion. As another example, an indicative gesture may comprise dragging or flicking a virtual message object toward a virtual gateway. A touch-screen display 116 may detect the drag or flick and send a representative sensor signal to the processor 110.

In the embodiment shown in FIG. 1, processor 110 is also in communication with display 116, which is configured to display a graphical user interface. Display 116 may comprise a touch-sensitive input device, such as a touch-screen, configured to send/receive signals to/from processor 110. The graphical user interface shown on the touch-screen display 116 facilitates the user's interaction with the messages. The graphical user interface comprises a virtual message environment, in which messages are represented as virtual message objects. A virtual message object may be selected and manipulated by contacting it directly via touch-screen display 116. In one mode of interaction, two-dimensional finger gestures on a touch screen display may select, drag, flick, throw, and/or move a virtual object within the virtual message environment.

Signals received from a touch-screen display 116 may be associated with a transmission characteristic of a virtual message object in a graphical user interface. In one variation, a predetermined gesture on touch-screen 116, such as flicking or dragging a virtual message object, may be associated with a transmission characteristic, such as speed and/or angle of transmission of the virtual message object. In one embodiment, a quick flick is associated with a fast transmission characteristic of a virtual message object, while in another embodiment, a slow drag is associated with a slow transmission characteristic.

The processor 110 may determine a haptic feedback effect based, at least in part, on a virtual message object's transmission characteristic. In one variation, a user indicates that a virtual message object should be sent to another user by quickly jabbing the mobile device 102 in the direction of a virtual gateway. Based on the quick jab, processor 110 determines a fast transmission characteristic and that the virtual message object should be transmitted. Then the processor 110 determines a haptic effect, such as a quick vibration, based at least in part on the fast transmission characteristic. Finally, processor 110 transmits a haptic signal representing the haptic effect to actuator 118.

As shown in FIG. 1, the processor 110 is also in communication with one or more actuators 118. Actuator 118 is configured to receive a haptic signal from processor 110 and output a haptic effect. After processor 110 determines a haptic effect, it sends a haptic signal to actuator 118. The haptic signal is configured to cause actuator 118 to output the determined haptic effect. Actuator 118 may be, for example, a piezoelectric actuator, an electric motor, an electro-magnetic actuator, a voice coil, a linear resonant actuator, a shape memory alloy, an electro-active polymer, a solenoid, an eccentric rotating mass motor (ERM) or a linear resonant actuator (LRA).

Processor 110 is also in communication with a track ball 122. Processor 110 may receive signals representing user interaction from track ball 122. For example, track ball 122 may be used to scroll or navigate through a menu of message recipients in an address book. After a recipient has been selected, the track ball may be pressed to confirm the selection of a recipient. When the track ball 122 is pressed, a virtual gateway associated with the selected recipient may be displayed in the virtual message environment. When a virtual gateway is displayed, the processor 110 is ready to send the virtual message object to a particular recipient.

Figure 2:
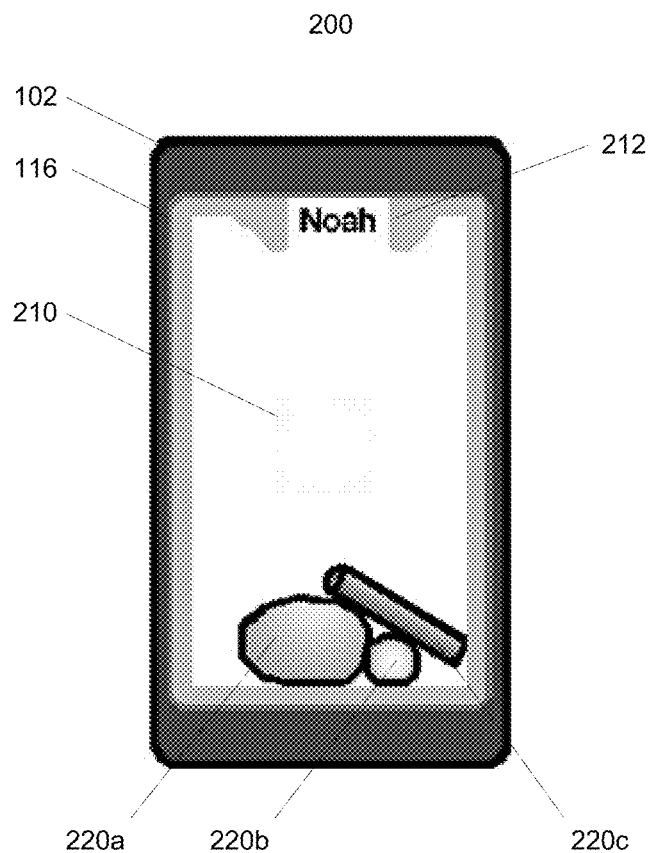
FIG. 2 is an illustration of a system for transmitting haptic messages according to one embodiment of the present invention.

FIG. 2 is an illustration of a system for transmitting haptic messages according to one embodiment of the present invention. The elements of system 200 are described with reference to the block diagram depicted in FIG. 1. A variety of implementations other than that shown in FIG. 1 are possible.

As shown in FIG. 2, system 200 comprises a mobile device 102, such as a mobile phone, PDA, portable media player, or portable gaming device. The mobile device 102 is configured to send and receive signals, such as voice mail, text messages, and other data messages, over a network such as a cellular network or the Internet. The mobile device 102 may comprise a wireless network interface and/or a wired network interface 112. Although the device 102 is illustrated as a handheld mobile device in FIG. 2, other embodiments may comprise different devices, such as video game systems and/or personal computers.

As shown in FIG. 2, the mobile device 102 comprises a display 116. In addition to display 116, the mobile device 102 may comprise buttons, a touchpad, a scroll wheel, a rocker switch, a joystick, or other forms of input devices (not shown in FIG. 2). Additionally, display 116 may comprise a touch-sensitive input device, such as a touch screen.

Display 116 is in communication with processor 110. Display 116 is configured to display virtual message environment 210, and may comprise one or more virtual message objects. Virtual message objects may take the shape of any object display 116 is capable of showing. For example, virtual message objects may take the form of: arrows, balls, capsules, hearts, and tubes. As shown in FIG. 2, the virtual message environment 210 comprises three virtual message objects 220a, 220b, and 220c. Inside the virtual message environment 210, virtual message objects 220a, 220b, and 220c may move freely, bouncing and colliding with other virtual message objects and the boundaries of the virtual message environment 210.

Each virtual message object may represent a message and/or a file, such as a text message, a picture, a video, a voicemail, a reminder, or a pseudo-emotional message such as a smiley face or a frowning face. The content of a virtual message object may be used determine the shape of the virtual message object. For example, a virtual message object in the form of a tube or a rolled-up scroll 220c may represent a text message. Or a virtual message object in the form of an egg or a capsule 220a may represent a message with an attachment, such as a video file, a picture, or a song. Virtual message objects may also represent various forms of non-verbal communication, such as gestures, facial expressions, or emotions. For example, virtual message object 220b, shown as a ball, may correspond to a non-verbal message such as an indication of playfulness. A virtual message object represented as an arrow may represent a poke or a jabbing gesture (i.e. to request or demand attention). Other virtual message objects may appear as a heart, a basketball, a water balloon, a typewriter, or another shape that display 116 is capable of displaying. Effective virtual message objects comprise easily identifiable visual and/or haptic properties and/or effects. For example, a virtual message object can represent a work file in the form of a typewriter and include a haptic effect that represents the clanging keys of a typewriter. Or the virtual message object representing an unimportant email may be in the form of a bowling ball and include a haptic effect which represents a bowling ball hitting pins.

A virtual message object may comprise a data store defining characteristics of the virtual message object. These characteristics may include information regarding how the virtual message object interacts with other virtual message objects and the boundaries of the virtual message environment. For example, in one embodiment, a virtual message object may appear in the form of a rubber ball and include data which causes the ball to easily bounce off other virtual message objects. In another embodiment a virtual message object may appear in the form of an egg, and contain data which causes the egg to easily shatter if impacted by another virtual message object.

Representing messages as virtual message objects enables a user to quickly determine information about a message without opening it. In some embodiments, the size of a message corresponds to the size or mass of the virtual message object. A message with a large file attachment can be represented as a large or massive object. The haptic collision effect associated with a large or massive object may be composed of strong (high magnitude) vibrations. A message such as a short text message or a message with a small file attachment can be represented as a small virtual message object. The haptic collision effect associated with a small virtual message object may be composed of soft (low magnitude) vibrations. In this way, all of the physical properties (visual appearance, haptic characteristics, etc.) are interrelated. This enables the user to gather information about the virtual message object and its contents from multiple sources at once.

In some embodiments, a virtual message object may comprise a text message. In such an embodiment, the virtual message object may include pre-written text. In other embodiments, the user may enter unique text for a virtual message object. In such an embodiment, the user interacts with the virtual message object to indicating that the user wishes to enter text. For example, such an interaction may comprise double-tapping the virtual message object. Sensor 114 or track ball 122 detects the user interaction, and transmits a corresponding signal to processor 110. Based on the received signal, processor 110, generates a text box, and displays this text box on display 116. In some embodiments, the text box may comprise a simple QWERTY keyboard for entering text. In other embodiments, the textbox may be more complex. For example, the text box may comprise a virtual representation of an old-fashioned mechanical typewriter. In such an embodiment, when the user depresses a key of the mechanical typewriter, the processor 110 may output an audio signal and haptic effect corresponding to the typewriter's clanging keys. In another embodiment, the textbox may comprise a blank sheet of paper, that the user can write on by interacting with the mobile device. For example, using a touch-screen, the user could sign their name using their finger or a stylus. In another example the user may write a complete message using their finger or a stylus. In other embodiments, the user may move the entire mobile device in pattern substantially approximating text. In such an embodiment, the display may show a virtual object in the form of a spray-paint can. When the user wishes to enter text, the user may press the spray-paint can and move the mobile device in a pattern substantially approximating the text the user wishes to enter. Sensor 114 may detect the movement, and transmit a corresponding signal to processor 110. Based on the received signal, processor 110 determines the entered text.

In some embodiments, a user may embed a haptic effect into a specific words within the text message. In such an embodiment, the user may enter a text message, and then interact with a specific word within the text message. Sensor 114 or Track ball 122 may detect the interaction and transmit a corresponding signal to processor 110. In such an embodiment, the user interaction may comprise double-clicking a specific word within a text message. Based on the received signal, processor 110 may determine that the user intends to add a haptic effect to a word. The processor 110 may then transmit an audio, haptic or visual signals which indicate that the processor 110 is ready to receive haptic information. The user may then enter a haptic effect, which the processor 110 appends to the word. In some embodiments, the haptic effect is pre-loaded on the mobile device. In other embodiments, the user may enter a new haptic effect via sensor 114. In such an embodiment, the user may shake the mobile device, and sensor 114 may detect the movement and transmit a corresponding signal to processor 110. Based on the received signal, processor 110 may determine a new haptic effect which corresponds to the shaking of the mobile device. Then, when the user transmits the message to a recipient, the recipient may touch the word, and feel the associated haptic effect. For example, in one embodiment a user may send a message including the word "love." In such an embodiment, the user may append a haptic effect comprising a beating heart to the word love. Then the recipient can feel the beating heart when the recipient interacts with the word love. In another embodiment, a user may enter their signature, and append a haptic effect to their signature. Such an embodiment may allow the user to attach a haptic signature to messages.

The virtual message environment 210 also comprises a virtual gateway 212. A virtual message object may be sent to other mobile devices by moving it through the virtual gateway 212. As a virtual message object moves through the virtual gateway 212, it is transmitted to a recipient device and "leaves" the local virtual message environment 210. Thus, embodiments of the invention may utilize a spatial metaphor for sending messages, facilitating a more intuitive process of sending messages.

The virtual gateway 212 may be displayed by replacing a section of the virtual message environment 210 with the virtual gateway 212. The virtual gateway 212 may comprise a visual indication of the recipient(s) it is directed toward. For example, the virtual gateway 212 may show the name of a selected recipient. In FIG. 2, "Noah" is shown as the potential recipient of a virtual message object sent through the virtual gateway 212. In another variation, a group of recipients, such as a "family" group or a "classmates" group may be shown in the virtual gateway 212. In such a variation, when a virtual message object is sent through a virtual gateway 212 indicating a recipient group, the virtual message object is sent to the mobile device of each individual in the group.

Illustrative Methods for Transmitting Haptic Messages

Figure 3:
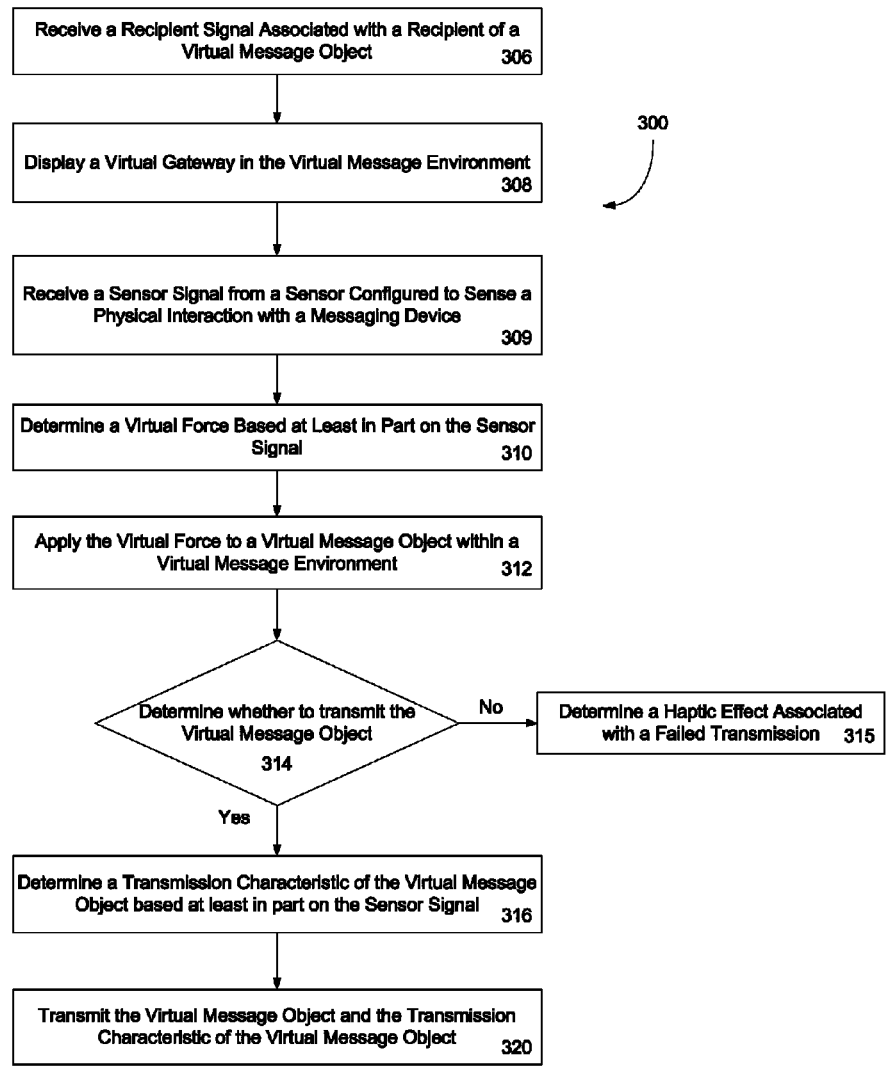
FIG. 3 is a flow diagram of a method for transmitting haptic messages according to another embodiment of the present invention.

FIG. 3 is a flow diagram of a method for transmitting haptic messages according to one embodiment of the present invention. While embodiments of the current invention may be utilized in a variety of devices, the process shown in FIG. 3 will be described in relation to the block diagram shown in FIG. 1 and the device shown in FIG. 2.

In method 300, processor 110 receives a recipient signal associated with a recipient of the virtual message object 306. Processor 110 may receive a recipient signal from a button, scroll wheel, or other input device, such as track ball 122 or sensor 114. In one embodiment, processor 110 displays a sequential list of names from an address book stored in local memory. The names can be shown in the virtual message environment 210, for example, at the top or the bottom of the display 116. To scroll through the names, a left or right button is pressed. When the correct name for the intended recipient has been identified, the track ball 122 may be depressed to send a recipient signal to the processor 110. In one variation, a user may scroll through names in an address list by shaking the device in a left or right direction. With a small, soft shake, the processor 110 may progress through the address list by small increments, such as one or two names in either direction. With a large, violent shake, processor 110 may progress through the address list by larger increments, such as ten or twenty names in either direction.

Next, processor 110 displays virtual gateway 212 in the virtual message environment 308. Virtual Gateway 212 may be associated with the recipient of a virtual message object. For example, virtual gateway 212 may comprise a visual indication of a recipient by displaying the name of the recipient. In the event of a network failure, processor 110 may close the virtual gateway 212, yielding visual and/or haptic cues to the user that a virtual message object cannot be sent. In one variation, when processor 110 determines that a recipient cannot receive a virtual message object, the virtual message object may bounce against the virtual gateway 212 and remain in the virtual message environment 210. Once the virtual gateway 212 has been established, a virtual message object may be sent to a recipient. The virtual message object may be sent with a gesture moving it toward the virtual gateway 212.

Next, processor 110 receives a sensor signal from a sensor 114 configured to sense a physical interaction with a mobile device 309. The sensor 114 may detect both a direction and magnitude of the user's interaction. For example, if a user jerks the mobile device away from her body, the sensor 114 may detect both the speed with which the device was moved as well as the direction. In another example, the sensor signal may be associated with a user interaction wherein the user drags a virtual message object toward virtual gateway 212. In this way, the sensor signal may comprise a gesture directed toward the virtual gateway. In another example, the sensor signal may be associated with the mobile device 102 having been tilted.

Then, processor 110 determines a virtual force based at least in part on the sensor signal 310. The processor 110 may determine both a direction and a magnitude of the virtual force. For example, the force may be in a direction perpendicular to the virtual objects and at a low intensity. In another example, if the user tilts the mobile device, the processor 110 may determine a force representing gravity, pulling virtual objects in the direction the user tilted the device. In other embodiments, the processor 110 may determine a force that varies in direction or intensity over time.

Next, the processor 110 applies the virtual force to a virtual message object within a virtual message environment 312. The virtual message object will then move within the virtual message environment based, at least in part, on the magnitude and direction of the virtual force. The virtual message object's behavior may further be defined by data contained in a data store. This data defines characteristics of the virtual message object's interaction in the virtual message environment. For example, the virtual message object may be in the shape of an egg, and have a characteristic defining a brittle surface. Then, if a virtual force of a high magnitude is applied to the surface of the virtual message object, the object may crack. In another example, the virtual message object may have a characteristic which defines a solid ball. When a virtual force of high intensity is applied, the ball may roll in the direction of the virtual force.

Then, the processor 110 determines whether to transmit the virtual message object 314. This determination may be based at least in part on the virtual force and the status of a recipient. Processor 110 may analyze the speed and angle of the force to determine if the virtual message object's trajectory will take it through the virtual gateway 212. If processor 110 determines that the trajectory will not carry the virtual message object through the virtual gateway 212, then processor 110 may determine not to transmit the virtual message object. But if the transmission characteristic of a virtual message object will carry it through the virtual gateway 212, then processor 110 may transmit the virtual message object. Additionally, processor 110 may determine whether to transmit the virtual message object based, at least in part, on the status of a recipient. For example, if the recipient has turned their mobile device off or disconnected it from the network, processor 110 may determine not to send the virtual message object. In another example, if the status of a recipient's mobile device is set to "hidden," processor 110 may determine not to send the virtual message object.

If at 314, processor 110 determines that a virtual message object should not be transmitted, then processor 110 may determine a haptic effect associated with a failed transmission 315. For example, after processor 110 determines that a virtual message object should not be sent, it may determine a haptic effect simulating the virtual message object bouncing against the virtual gateway 212 and staying in the virtual message environment 210.

Then, processor 110 determines a transmission characteristic of the virtual message object based, at least in part, on the sensor signal 316. In one embodiment, the sensor signal is associated with a hurried or forceful gesture, so processor 110 determines a corresponding hurried or forceful transmission characteristic. In another embodiment, a sensor signal may be associated with a gentle or slow gesture; thus, processor 110 may determine a corresponding gentle or slow transmission characteristic.

In some embodiments, the sensor signal may be associated with an angle of transmission of a virtual message object. For example, a user may move a virtual message object toward the virtual gateway at an angle. In this case, the virtual message object travels through the virtual gateway at an angle; therefore, processor 110 may determine an angular transmission characteristic. Alternatively, if a user sends a virtual message object straight through the virtual gateway, the processor 110 may determine a straight transmission characteristic Finally, the processor 110 transmits the virtual message object and the transmission characteristic of the virtual message object 320. In some embodiments, transmission will occur when the virtual message object passes through the virtual gateway 212. When a virtual message object is sent through the virtual gateway 212, the virtual message object may disappear from the local virtual message environment 210. The disappearance may occur at substantially the same time as the virtual message object is transmitted across a network. If the virtual message object is not successfully transmitted to the recipient, it will remain in the virtual message environment 210. This provides the user with simple information regarding the status of the network connection or the status of the recipient device.

In one variation, when a virtual message object leaves the virtual message environment 210, processor 110 transmits a haptic signal to an actuator 118 alerting the user that the message has been successfully transmitted. For instance, processor 110 may determine a haptic effect that simulates an arrow hitting a wall.

Figure 4:
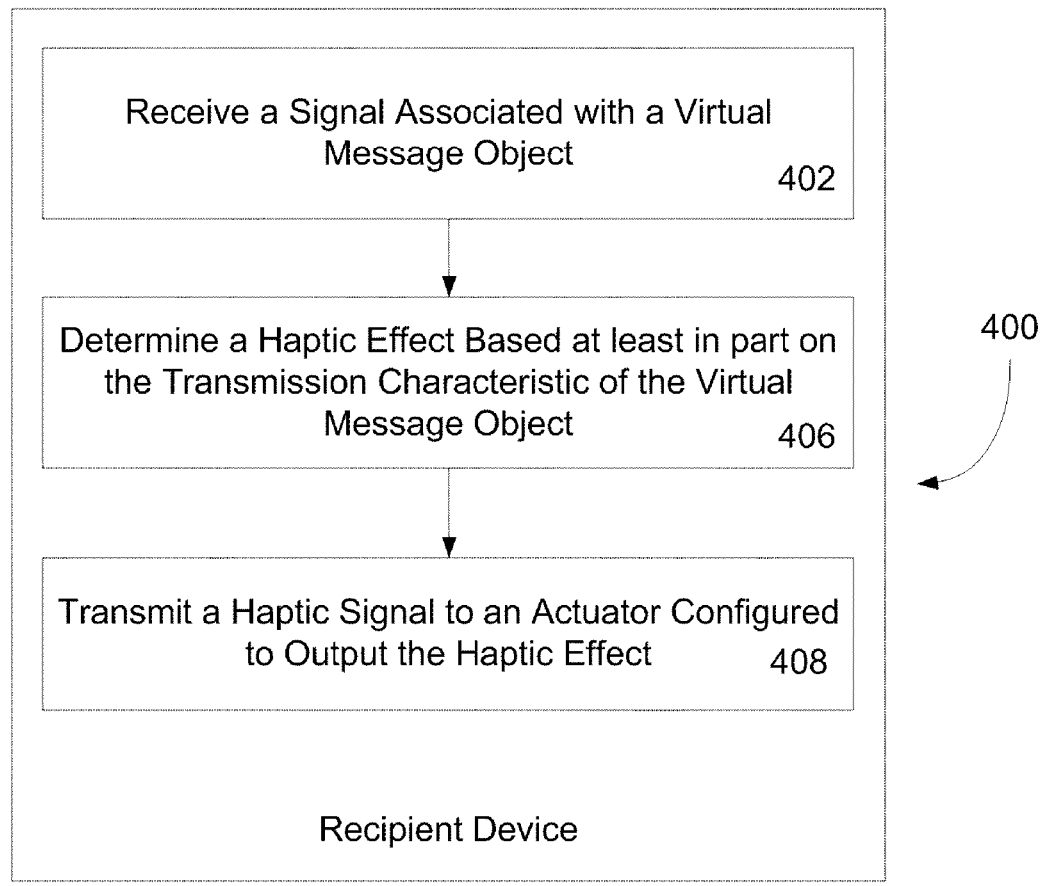
FIG. 4 is another flow diagram of a method for transmitting haptic messages according to another embodiment of the present invention.

FIG. 4 is a flow diagram of a method for transmitting haptic messages according to one embodiment of the present invention. FIG. 4 shows an embodiment wherein a virtual message object is received by a recipient mobile device.

In method 400, the recipient device's processor receives a signal associated with a virtual message object 402. The signal may be received from a network interface which is communicatively connected to an external network such as a cellular network, intranet, or the Internet. For example, the signal may have been transmitted across a network by another mobile device connected to that network. The signal associated with the virtual message object comprises data defining the virtual message object's characteristics. For example the signal may comprise data defining characteristics such as a virtual message object's size, shape, transmission characteristic, data type, and contents.

Then the recipient device's processor determines a haptic effect based, at least in part, on the transmission characteristic of the virtual message object 406. For example, if the sending mobile device is gently tilted toward a virtual gateway when the virtual message object was sent, then the transmission characteristic may comprise a low speed. The recipient device's processor will then use that transmission characteristic to determine a haptic effect comprising a gentle vibration. The gentle vibration simulates the virtual message object hitting a boundary of the recipient virtual message environment at a low speed. In contrast, a haptic effect based on a high speed transmission characteristic may comprise a strong jolt, to simulate the virtual message object arriving in recipient's virtual message environment at a high speed.

Finally, the recipient device's processor transmits a haptic signal to an actuator configured to output the haptic effect 408. The actuator will then output a haptic effect based, at least in part, on this signal.

Illustrative Scenarios for Generating and Transmitting Haptic Messages

Figures 5A, 5B:
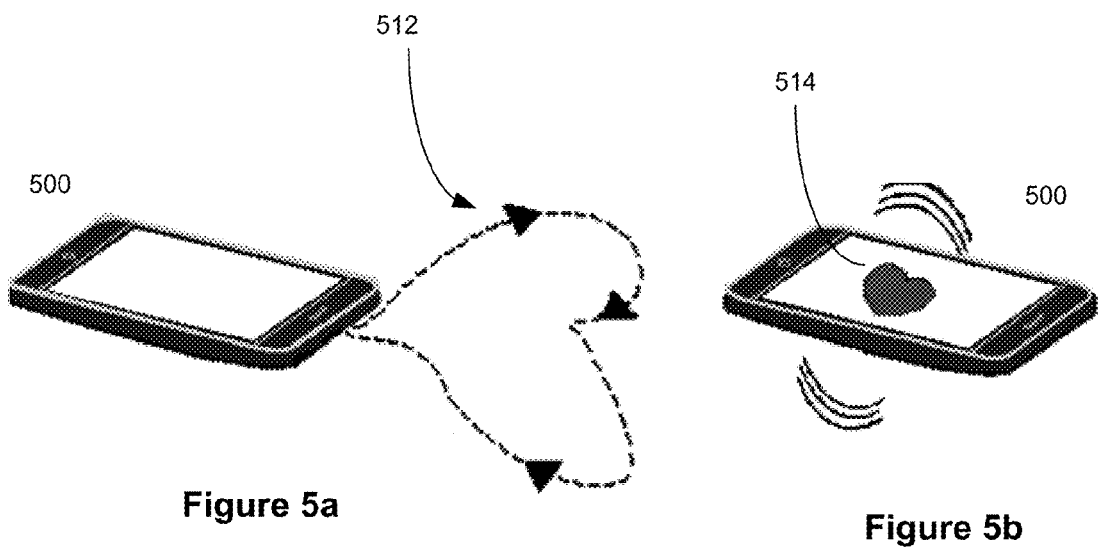
FIGS. 5a and 5b are illustrations of generating haptic messages according to one embodiment of the present invention.

FIGS. 5a and 5b are illustrations of generating haptic message objects according to one embodiment of the present invention. FIG. 5a comprises a mobile device 500. A user may generate the virtual message object by placing the mobile device 500 in generate mode. The user then moves the mobile device in a predefined pattern. This motion is detected by the sensor 114 which transmits a sensor signal associated with the motion of the mobile device to the processor 110. Processor 110 will then determine a personal token based at least in part on the sensor signal. For example, a user may wish to define a personal token in the form of a heart. In order to define this personal token, a user may perform a gesture which moves the mobile device in the shape of a heart 512. This gesture may for example move the mobile device upward and over, then downward at an angle. The gesture may then move the mobile device upward and then over and down at an angle until the mobile device is in substantially the same position as it started. The sensor 114 will then transmit a signal associated with the heart shaped gesture to the processor 110. Based on this gesture, the processor 110 will generate a virtual message object comprising a personal token in the form of a heart 514. In other embodiments, the user may enter virtual message objects of other shapes.

In some embodiments the user may create a virtual message object with a user defined shape. In such an embodiment, the display 116 may show a spray-paint cant. The user may then press the spray-paint can, and move the mobile device in a pattern. The sensors 114 may detect this motion and transmit a sensor signal corresponding to the motion to processor 110. Based on the received signal the processor 110 will generate a virtual message object substantially corresponding to the shape of the detected movement. In some embodiments, a user may move the mobile device in a pattern substantially approximating letters. In such an embodiment, the processor 110 may generate text which corresponding the letters. The user may then append this text to a virtual message object.

Figure 6:
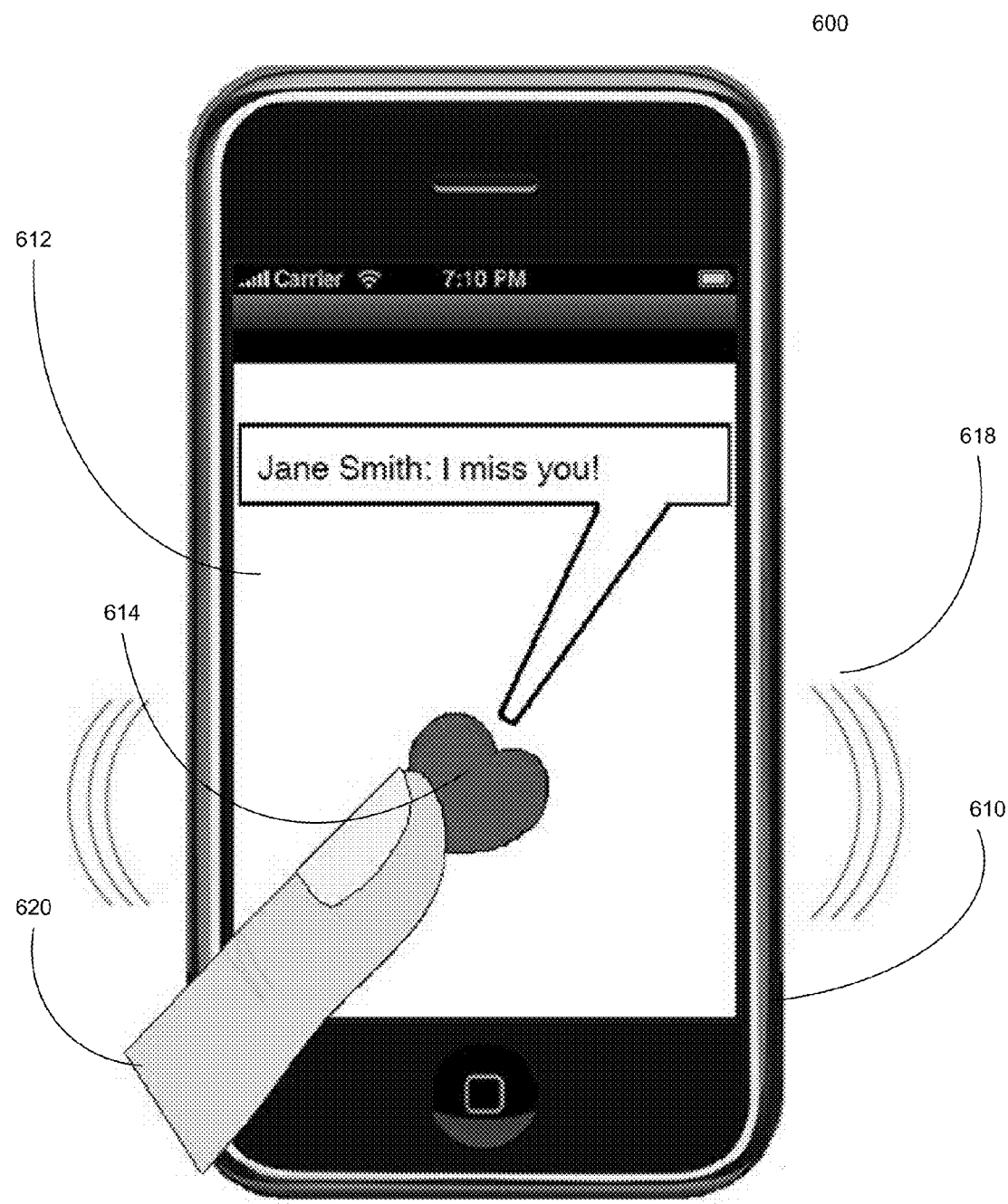
FIG. 6 is an illustration of generating haptic messages according to one embodiment of the present invention.

FIG. 6 is an illustration of generating a haptic message according to one embodiment of the present invention. FIG. 6 shows mobile device 600. Mobile device 600 comprises a virtual message environment 612 which is displayed on touch screen display 610. The virtual message environment comprises a virtual message object 614 in the shape of a heart. The virtual message object 614 comprises a personal token which will exhibit the same characteristics on a recipient's mobile device as it exhibits on the sender's mobile device.

The virtual message object may comprise animation and a haptic effect. For example, a virtual message object in the form of a heart may be animated to appear to be beating or throbbing. Arrow 618 shows lines which represent a haptic effect associated with the virtual message object. The virtual message object may further comprise a beating or throbbing haptic effect to representative of a beating heart.

Arrow 620 shows a finger touching the virtual message object. When the user interacts with the virtual message object, the touch-screen display 610 detects the user interaction and transmits a signal associated with the user interaction to the processor 110. Based on the received signal, the processor 110 may calculate a transmission characteristic of the virtual message object. For example a user may flick the virtual message object toward the virtual gateway, causing the mobile device to send the virtual message object. In another embodiment, the mobile device may use the microphone to detect a user interaction with the virtual message object. For example the microphone may detect that the user has blown into the mobile device. The microphone may then transmit a signal to the processor 110 associated with the user blowing into the microphone. Based on this signal, the processor 110 may determine a transmission characteristic of the virtual message object. For example the processor 110 may determine a transmission characteristic associated with a sender blowing a kiss to a recipient.

Figure 7:
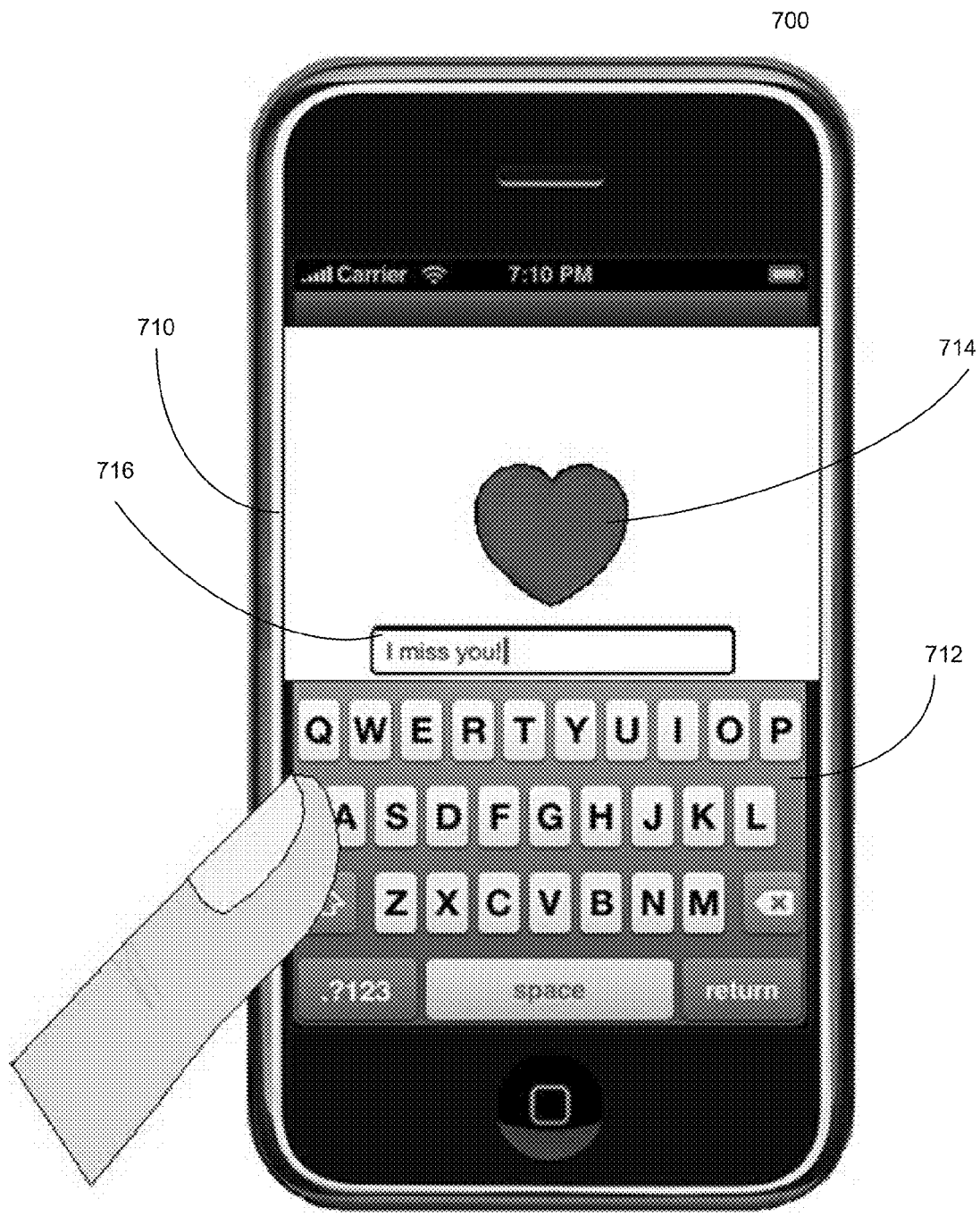
FIG. 7 is an illustration of generating haptic messages according to one embodiment of the present invention.

FIG. 7 is an illustration of generating a haptic message according to one embodiment of the present invention. Prior to sending the message, the user may define additional characteristics of the personal token. FIG. 7 shows a mobile device 700 after the user has double clicked the personal token 714. When the user double taps the personal token 714, a virtual keyboard 712 appears on touch-screen display 710. The user may then type a short message and click a button associated with a submission to append the message to the personal token 714. For example, arrow 716 shows that the user has entered the message "I miss you!" to the personal token 716. In other embodiments, the virtual keyboard 712 may comprise an old fashioned typewriter. In such an embodiment the processor 110 may transmit audio and haptic signals corresponding to the clanging keys of the typewriter. Actuator 118 and Speaker 120 may receive these signals and output corresponding haptic and audio effects.

FIGS. 8a and 8b are illustrations of deleting a haptic message according to one embodiment of the present invention. A user may decide not to send a personal token and instead to delete it. FIG. 8a shows mobile device 800, which comprises a touch-screen 810. Touch-screen 810 comprises a personal token 812 in the form of a heart. The user has decided to delete personal token 812. Thus, the user moves their finger over touch-screen display 810 in an X-pattern 814. Touch-screen display 810 detects this interaction and transmits a signal associated with the X-Pattern to processor 110. Based at least in part on this signal, processor 110 determines that the personal token 812 should be deleted. Thus, processor 110 removes the personal token from display 810.

FIG. 8b shows mobile device 800 comprising touch-screen display 810 a short time after the user has deleted the personal token. The processor 110 may remove the personal token from display 810 in a variety of ways. For example, in one embodiment, processor 110 may remove the personal token by causing it to slowly fade off touch-screen 810. In another embodiment, processor 110 may remove the personal token by causing it to pop and quickly disappear from touch-screen 810. In some embodiments, processor 110 will calculate a haptic effect associated with the removal of personal token 812. Processor 110 will then transmit a signal associated with the haptic effect to actuator 118, which then outputs the haptic effect.

Illustrative Method for Generating and Transmitting Haptic Messages

Figure 9:
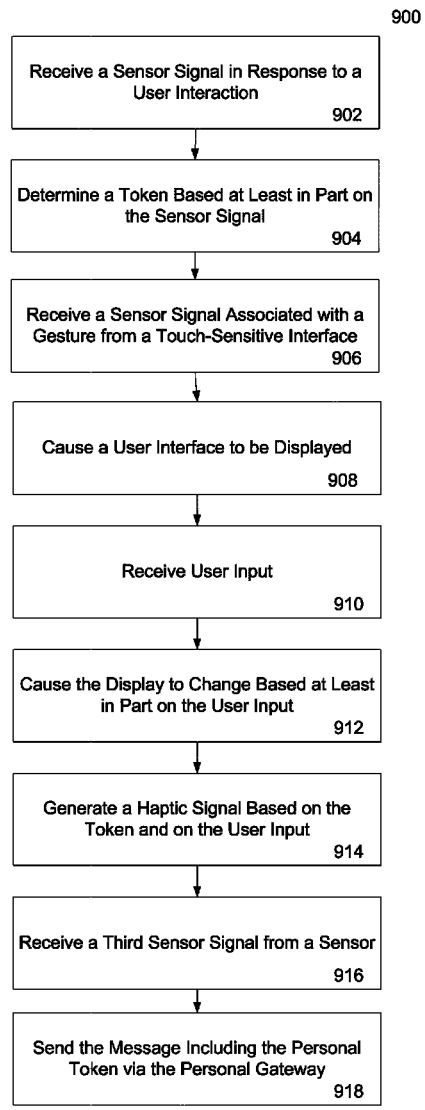
FIG. 9 is a flow chart illustrating a process of generating and transmitting haptic messages according to one embodiment of the present invention.

FIG. 9 is a flow chart illustrating a process of generating and transmitting a haptic message according to one embodiment of the present invention.

The method 900 begins when the processor 110 receives a sensor signal in response to a user interaction 902. The user interaction may be a user moving the mobile device 102 in a predefined pattern. The predefined pattern may be, for example, moving the mobile device 102 in a heart shaped pattern.

Next, the processor 110 determines that the user indicated a personal token, based at least in part on the sensor signal 904. A personal token may be a virtual message object comprising a personal message. The virtual message object exhibits the same characteristics in a recipient's mobile device as in the sender's mobile device. In one embodiment, the personal token has a shape that visually reflects the interaction associated with the received sensor signal. For example if the sensor signal is associated the motion of the device that substantially corresponds to the shape of a heart, the personal token may take the form of a heart.

Then, the processor 110 receives a sensor signal associated with a gesture from a touch-sensitive interface 906. In one embodiment the touch-sensitive interface may be a touch-screen display. In other embodiments the touch-sensitive interface may be a trackball or push-button. In some embodiments, the gesture may comprise a double-tap on a button displayed on the touch-screen display.

Next, the processor 110 causes the display 116 to display a user interface 908. In one embodiment, the user interface may be for example a virtual keyboard for text entry. In other embodiments, the user interface may provide an element for adjusting the color or haptic feedback associated with a personal token.

Then, the processor 110 receives user input entered via the user interface 910. In one embodiment, the user inputs text on a virtual keyboard. For example, the user may type a short text message associated with the personal token. In other embodiments, the user input may include a color, shape, or specific haptic feedback associated with the personal token.

Then, the processor 110 causes the display 116 to change based at least in part on the user input 912. In one embodiment, processor 110 may change the display 116 to show a textbox comprising text that the user entered. In other embodiments, processor 110 may change the display 116 by altering the shape, color, or other characteristics of the personal token. For example, in one embodiment, the user enters a text message associated with a personal token in the shape of a heart. When the processor 110 associates the text message with the heart, the processor 110 causes the heart to begin beating.

Next, the processor 110 generates a haptic signal based on the personal token and on the user input 914. In one embodiment, for example, the personal token may be in the form of a heart. In this embodiment, the haptic signal may correspond to a beating or throbbing heart. In other embodiments, the haptic signal may be associated with another interaction of the personal token. For example the haptic signal may be based on a particular haptic effect that a user has associated with a message, such as a vibration or clicking; or the haptic signal may be based on some other parameter, such as the color of a personal token.

Next, the processor 110 receives a microphone input associated with a user blowing into the microphone 916. For example, in one embodiment a user may blow on a microphone incorporated into the mobile device 102. In another embodiment, a user may blow at a region of the device, or in the direction of the whole device. In all of these examples, the user's breath is detected by the microphone, and the microphone then transmits a signal to the processor 110 associated with the user's blowing.

In response, the processor 110 sends the message including the personal token via the virtual gateway 918. For example, in an embodiment in which the personal token is a heart, the user blows on the microphone as if blowing a kiss. In response, processor 110 causing the message to be transmitted to the intended recipient. In another embodiment, the processor 110 transmits a personal token after applying a virtual force to the token. In such an embodiment, the virtual force carried the virtual message object through a virtual gateway. In such an embodiment, the processor 110 may have determined the virtual force based at least in part on a sensor signal associated with a user flicking the touch-screen display.

Figure 10:
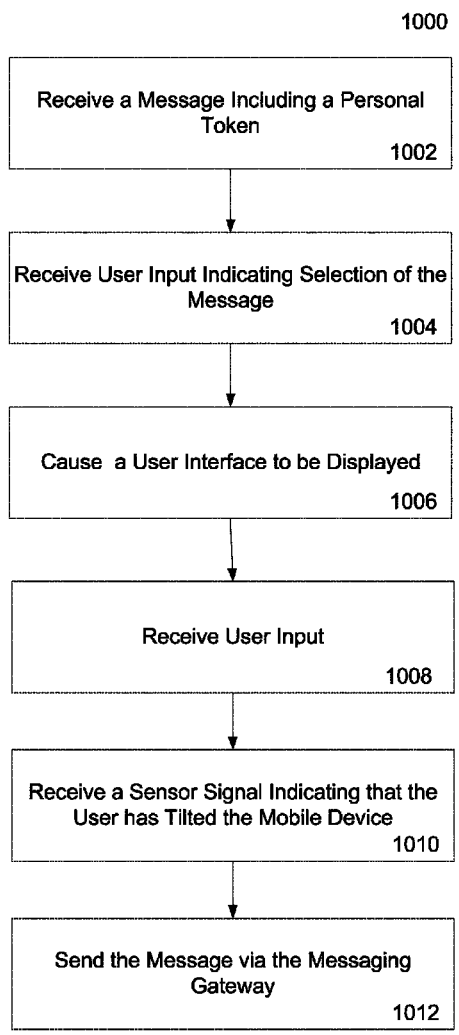
FIG. 10 is a flow chart illustrating a process of generating and transmitting haptic messages according to one embodiment of the present invention.

FIG. 10 is a flow chart illustrating a process of generating and transmitting a haptic message according to one embodiment of the present invention. Process 1000 begins when processor 110 receives a message including a personal token 1002.

Next, the processor 110 receives a user input indicating selection of the message 1004. In one embodiment, a touch-screen display may detect the user input, while in other embodiments a track ball 122 may detect the user input. In some embodiments the user input may comprise a tapping or double-tapping of the message. Or, in other embodiments the user input may comprise tilting or otherwise manipulating the mobile device 102.

Then, processor 110 causes display 116 to display a user interface 1006. In some embodiments, the user interface is a virtual keyboard for entering text. In such an embodiment, the keyboard may appear as a QWERTY keyboard. In other embodiments the keyboard may appear as an old-fashioned typewriter, and the mobile device may output audio and haptic effects corresponding to the clanging keys of the typewriter when the user enters text. In some embodiments, the user interface may be a text pad on which the user can write using a touch-screen display. For example, a user may use their finger to write their signature on the touch-screen display. In such an embodiment, the user may also assign a haptic effect associated with their signature. For example, a user may create a virtual signature which comprises their written signature and a haptic effect approximating a basketball bouncing on a court. The haptic effect may also be derived from the signature itself, i.e., the attributes of the writing (strokes, loops, etc.) may be translated to substantially similar haptic effect parameters (intensity, duration, periodicity, etc.) In other embodiments, the user interface may be an interface for modifying other characteristics of the personal token. For example the interface may enable a user to modify the shape, color, or haptic effect associated with the personal token.

Next, the processor 110 receives a user input 1008. In some embodiments a touch-screen display may receive the user input. For example, the user may enter text on the touch-screen display. In other embodiments, the user input may be received by other sensors within the device. For example, the user may enter input by tilting or otherwise manipulating the mobile device.

Then, processor 110 receives a sensor signal indicating that the user has tilted the mobile device 1010. In some embodiments a gyroscope, an accelerometer, a GPS, or other sensor capable of detecting movement transmits the sensor signal to the processor 110. For example, a gyroscope may determine that the user has tilted the mobile device to a 45-degree angle, and transmit a signal associated with that amount of tilt to the processor 110.

Then, the processor 110 sends the message via the messaging gateway 1012. In some embodiments, the messaging gateway will appear at the top of the display and comprise an indication of the intended recipient. In such an embodiment, a message is sent when a virtual representation of the message travels through the messaging gateway.

Figure 11A:
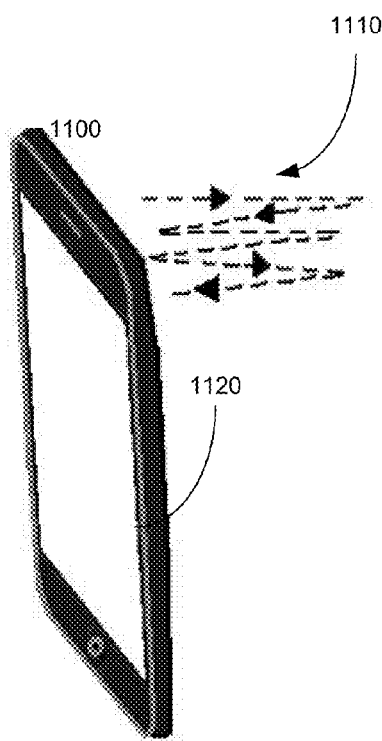
FIGS. 11a and 11b are illustrations of generating haptic messages according to one embodiment of the present invention.
Figure 11B:
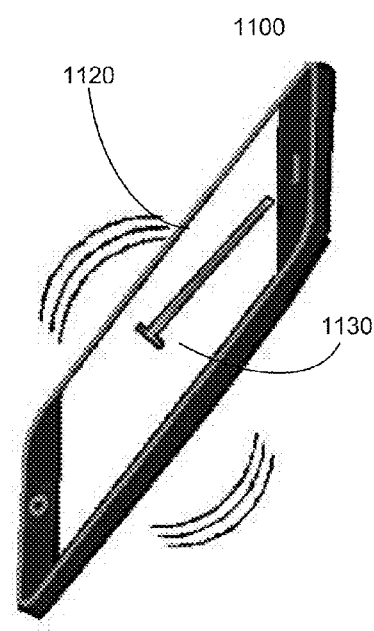

In some embodiments of transmitting haptic messages, a user may wish to send a pre-written form message to a recipient. FIGS. 11*a* and 11*b* are illustrations of generating a haptic message according to one embodiment of the present invention. FIG. 11*a* comprises mobile device 1100. A user may generate the virtual message object by placing the mobile device 1100 in a mode for generating a virtual message object. The user then moves the mobile device in a predefined pattern. This motion is detected by the sensor 114 which transmits a sensor signal associated with the motion of the mobile device to the processor 110. Processor 110 will then determine a virtual message object based at least in part on the sensor signal.

In some embodiments the processor 110 may determine that the motion is associated with a predefined virtual message object that comprises a business token. A business token is a business-related virtual message object that exhibits the same or substantially the same characteristics in a recipient's virtual message environment as it does in the sender's virtual message environment. For example, a predefined business token may take the form of a nail, and include the text and/or audio message, "You nailed it!" The business token may further comprise a haptic effect associated with the hammering of a nail. A recipient of the business token will feel this haptic effect when the business token arrives in their mobile device. Such an embodiment may provide the sender with the ability to provide a tangible response to a message.

In order to send the business token, a user may perform a gesture which moves the mobile device in a pre-defined pattern. For example a user may move the mobile device 102 up and down, simulating swinging a hammer 1110. Sensor 114 may detect the gesture and transmit an associated signal to processor 110. Processor 110 then determines whether the gesture matches the pre-defined pattern for the virtual nail business token. And based on the gesture, processor 110 will generate a business token 1130 on the display 1120, as shown in FIG. 11*b*. In some embodiments, processor 110 may determine a haptic effect associated with the virtual nail. Processor 110 will then output the haptic signal to actuator 118, which outputs the haptic effect. In some embodiments processor 110 waits for an indicative user interaction to send the business token. In other embodiments, the processor 110 generates the business token and then automatically sends it.

Figure 12A:
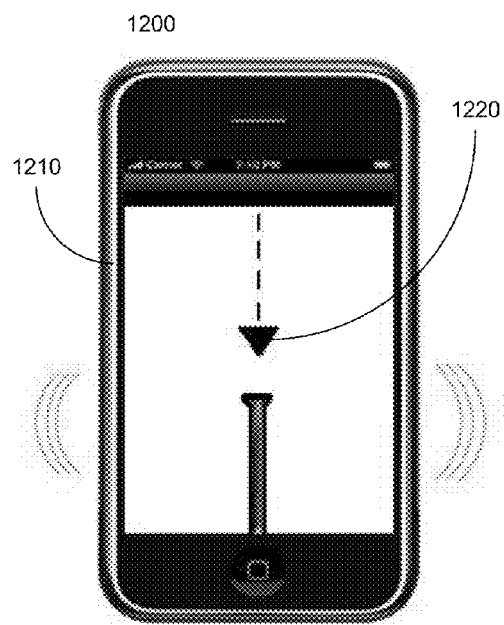
FIGS. 12a and 12b are illustrations of transmitting haptic messages according to one embodiment of the present invention.
Figure 12B:
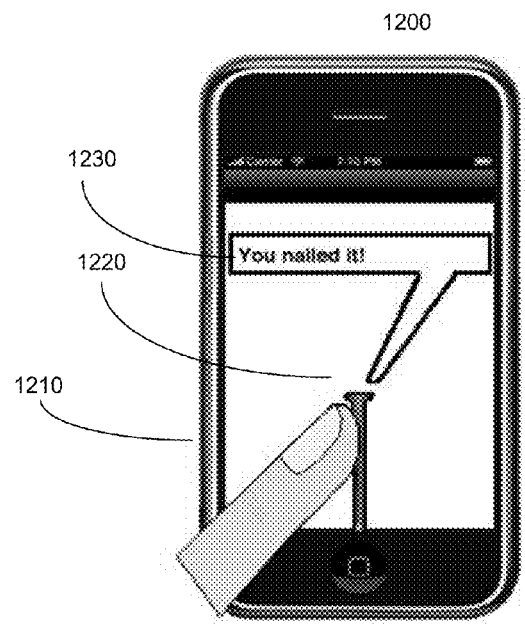

FIGS. 12*a* and 12*b* are illustrations of transmitting a haptic message according to one embodiment of the present invention. FIGS. 12*a* and 12*b* comprise mobile device 1200, which has just received a business token in the form of a virtual nail. Device 1200 comprises a display 1210 which comprises the recently received business token 1220. In some embodiments, upon receipt of the business token, mobile device 1200 may output a haptic effect associated with the business token. In one such embodiment, the haptic effect may approximate the pounding of a nail. In other embodiments, the mobile device may output another haptic effect. In yet another embodiment, the mobile device may not output a haptic effect In FIG. 12*b*, the mobile device 1200 comprises a touch-screen display 1210. The touch-screen display comprises a business token 1220. When the user interacts with the business token 1220, the touch-screen transmits a signal associated with the user interaction to processor 110. Based at least in part on this signal, processor 110 displays a message associated with the business token to the user. In the embodiment shown in FIG. 12*b*, the text associated with the virtual nail business token is "You nailed it!" 1230. In other embodiments, the user may define different text to associate with the business token.

Figure 13:
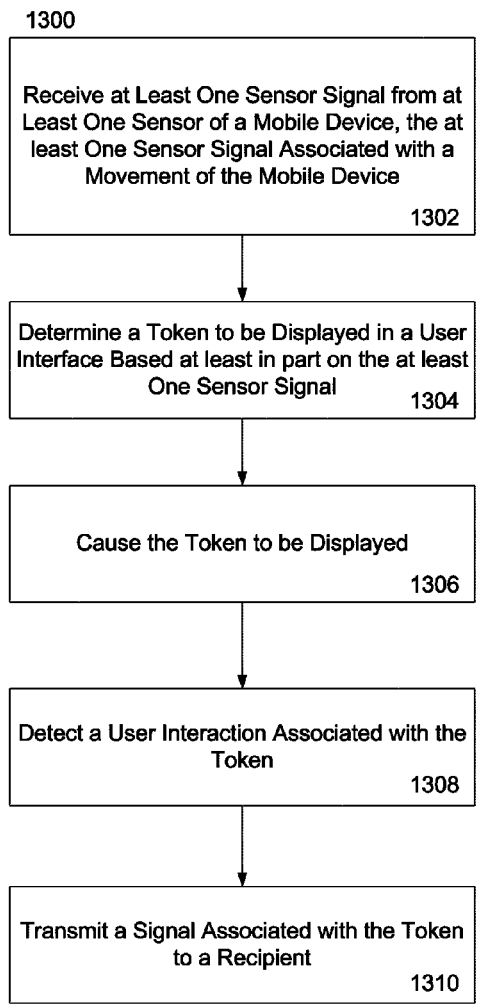
FIG. 13 is a flow chart for a process for generating and transmitting a haptic message according to one embodiment of the present invention.

FIG. 13 is a flow chart for a process for generating and transmitting a haptic message according to one embodiment of the present invention. FIG. 13 shows process 1300, which begins when processor 110 receives at least one sensor signal from at least one sensor 114 of a mobile device, the at least one sensor signal associated with a movement of the mobile device 1302. In some embodiments, the sensor 114 may comprise an accelerometer, a GPS, or other sensor capable of detecting movement. The movement may comprise any gesture which the sensor 114 is capable of detecting. For example, in some embodiments, the movement comprises a movement approximating the shape of a heart. In other embodiments, the movement comprises a movement approximating a hammering gesture. In still other embodiments the movement may approximate tossing a rope.

Then, processor 110 determines a token to be displayed in a user interface based at least in part on the at least one sensor signal 1304. The token takes a shape related to the movement of the mobile device. In some embodiments the token may take the shape of a nail or a heart. In other embodiments, the token is in another shape, such as a balloon, bubble, rope or dart.

Next, the processor 110 causes the token to be displayed 1306. The token is displayed in a display 116 of the mobile device. In some embodiments, display 116 may further comprise a graphical user interface. In such an embodiment, display 116 may show the token in the graphical user interface. In further embodiments one or more additional tokens may also appear along with the token in the graphical user interface.

Then, a sensor 114 detects a user interaction with the token 1308. In some embodiments, the sensor 114 may be a touch-screen display. In other embodiments the sensor 114 may be a track-ball 122. In still other embodiments, the sensor 114 may be a motion sensor such as an accelerometer, gyroscope, or GPS. In some embodiments, the user interaction comprises a single tap or a double-tap on the surface of the token. In other embodiments, the user interaction may comprise tilting or shaking the mobile device 102. In such an embodiment, the processor 110 may apply a virtual force to the virtual message object in response to the detected interaction. In still other embodiments, the sensor 114 may comprise a microphone. In such an embodiment, the user interaction may comprise blowing on the microphone. In such an embodiment, the processor 110 may apply a force to the token simulating the effects of the user blowing on the token. For example, in one embodiment, a token may be in the form of a bubble. When the user blows on the microphone, the processor 110 may determine a force acting on the bubble which simulates the user blowing a bubble to the recipient.

Finally, the processor 110 transmits a signal associated with the token to a recipient 1310. In some embodiments, the processor 110 may transmit the signal via network interface 112. In some embodiments, the mobile device may comprise a graphical user interface comprising a messaging gateway. In some embodiment, the messaging gateway may comprise information identifying the recipient. In some embodiments, after the processor 110 transmits a signal associated the token, the processor 110 removes the token from the display 116.

Transmitting Haptic Messages Using a Real-Time Link

When using a mobile device 102, a user may wish to interact with another user in real-time. One embodiment of the present invention provides the capability for users to transmit haptic messages over a real-time link. For example, in one embodiment, a first user can interact with a touch-screen of the mobile device 102. The interaction causes an object on the touch-screen to be modified. For example, the touch-screen may be blank, and as the user interacts with the screen, the processor 110 generates a line tracking the user's movements across the touch-screen. In such an embodiment, the line may substantially follow the point of contact between the user and the touch screen.

In such an embodiment, the changes to the first user's touch-screen are substantially simultaneously duplicated on the touch-screen of a second user's mobile device. The second user can similarly drag a finger over the touch-screen of the second user's device. The second user's interactions are subsequently tracked by a second line that is present on both the first user's touch-screen and the second user's touch screen.

In such an embodiment, when the two lines touch or overlap, a touch or collision is detected by the processors on the first and second mobile devices. And in response, both devices output a haptic effect indicating the interaction. In such an embodiment, the two users can touch one another in real time via haptic messaging.

In another embodiment, a user may modify a message or other object displayed on the screen of the sending device, and at substantially the same time, the message or object is modified on the recipient's device. The changes to the messages or objects may go beyond text updates and comprise changes to virtual properties of the objects, haptic effects associated with the objects, or other changes. In this way a user can use a mobile device to send real-time haptic messages.

For example, in some embodiments, two linked mobile devices each comprise a touch-screen display. In such an embodiment, the users of each device draw images on their respective mobile devices and their output is displayed on the recipient's device in substantially real-time. In one embodiment, if the sender's and recipient's fingers crossed the same relative location on their respective touch-screen displays, the mobile devices would each output audio and haptic effects associated with a collision or touching.

In another embodiment, the users may interact with an image that is simultaneously displayed on both users mobile devices. In such an embodiment, the users could simultaneously modify the image. The modifications would appear on both mobile devices substantially simultaneously. For example, one user could use their touch-screen to draw features on an image displayed on both mobile devices. In such an embodiment, for example, a user could crop the image, while the other user watches the cropping occur. In a further embodiment, a user could draw a comical mustache on an image, while the other user watches. This embodiment could be used for editing, or simply to entertain both users. Such an embodiment may be further used while both users are connected via a telephone call or other audio link.

In another embodiment, the mobile device generates a direct haptic link to another mobile device to play a game. For example, the users could play a game of virtual tennis. In such a game, a user could flick a tennis ball to a recipient via their touch screen. The recipient could then flick the tennis ball back to the sender. In such an embodiment, the tennis ball may further comprise a haptic effect that represents the force with which the user hit the ball. In such an embodiment the users could also carry on a conversation via a telephone or other audio link available through the mobile devices. The game could be used to fill awkward pauses in conversation and provide a sense of shared space between the users.

In another embodiment, while in a call or chat, one user may transmit virtual message to a recipient. The recipient may modify these objects and transmit them back. Such an embodiment may add ambient affects to the conversation, and serve to fill silence, or set the mood of the conversation. These objects may further serve to allow the users to work together to create a virtual message object that comprises a separate document. For example, two users may send a virtual message object comprising a text document. Each user may edit the document, and send the draft to the other user for review.

In one embodiment, a user may wish transmit a haptic gesture associated with a champagne toast to a recipient. The user may make a pouring gesture with their mobile device. A sensor 114 of the mobile device may detect the pouring gesture. The sensor 114 transmits a signal to the processor 110 associated with the tilting of the mobile device, Processor 110 may then determine that the user is attempting to send a champagne toast. Thus, the processor 110 transmits a signal to the display which causes the display to output an image of a champagne bottle. The processor 110 may further output an audio signal associated with the pouring of champagne to the speakers. Additionally, the processor 110 may output a haptic signal to an actuator associated with the pouring of champagne. The actuator may then output a haptic signal associated with the pouring of champagne.

Figure 14:
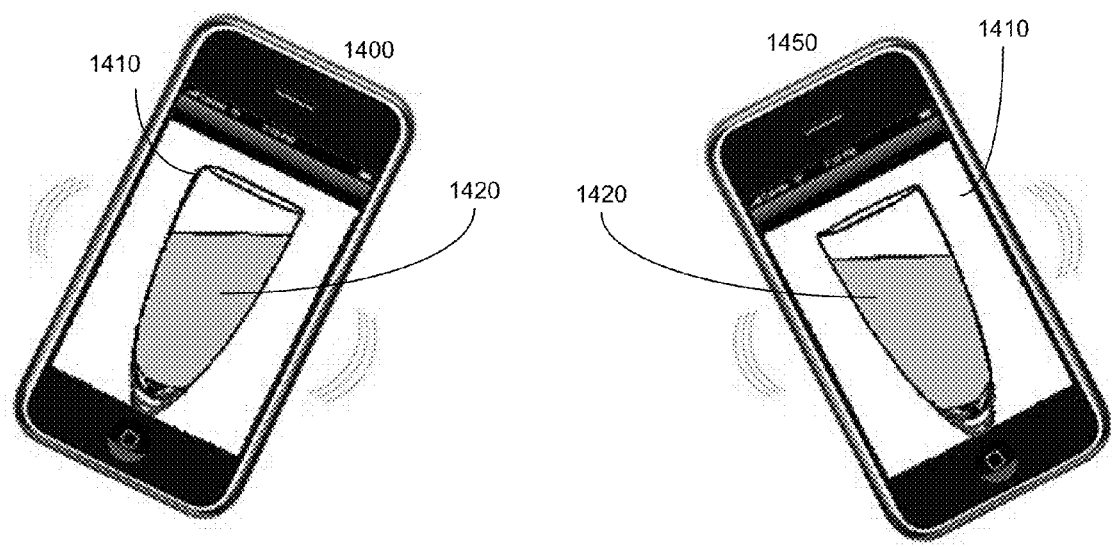
FIG. 14 is an illustration of transmitting haptic messages according to one embodiment of the present invention.

FIG. 14 shows two mobile devices, 1400 and 1450. Mobile device 1400 is the sending mobile device, and mobile device 1450 is the receiving mobile device. Each of mobile devices 1400 and 1450 comprise a display 1410 which comprises a virtual message object in the form of a glass of champagne 1420. When a user tilts either mobile device, a motion sensor 114 such as an accelerometer, gyroscope, or GPS determines that the user has tilted the mobile device and transmits a signal to processor 110 associated with the tilting. Processor 110 then calculates a virtual force representing gravity which is applied to the virtual champagne 1420. The force of gravity causes the champagne to shift within the glass as shown in both devices 1400 and 1450. In some embodiments, when the mobile device shifts, processor 110 determines a haptic effect associated with the shifting champagne. The processor 110 then transmits a signal associated with the determined haptic effect to actuator 118 which outputs the haptic effect.

Using signals from the sensor 114, the processor 110 determines the location of each of mobile devices 1400 and 1450 in relation to each other. Processor 110 uses the signal to determine if both users have raised their glasses at substantially the same time. If both devices 1400 and 1450 are raised at the same time, processor 110 will determine that a toast is occurring and determine audio and haptic affects associated with the clinking the results when two glasses collide. The processor 110 then transmit signals associated with audio and haptic effects to actuator 118 and speaker 120. Actuator 118 and speaker 120 may then output the determined haptic effect. In some embodiments, this effect may be gentle clink as though two crystal glasses have touched each other. In other embodiments, the haptic effect may be a thud associated with two heavy beer steins slamming into each other.

Figure 15:
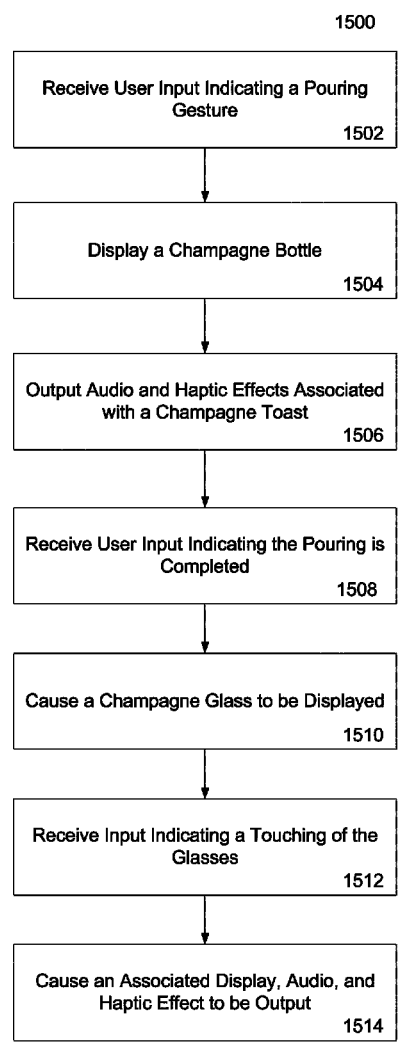
FIG. 15 is a flow chart illustrating a process of transmitting haptic messages according to one embodiment of the present invention.

FIG. 15 is a flow chart illustrating a process of transmitting a haptic message according to one embodiment of the present invention. Process 1500 begins when a sensor 114 detects a user input indicating a pouring gesture 1502. In some embodiments, the sensor 114 may comprise an accelerometer, gyroscope, GPS or other sensor capable of sensing motion. In some embodiments a user gesture indicating a pouring gesture may comprise tilting the mobile device to a predetermined angle.

Then, the processor 110 transmits a signal to the display which causes the display 116 to display a champagne bottle 1504. In some embodiments, rather than a bottle of champagne, a bottle of beer or another beverage may appear. In other embodiments, a glass comprising a beverage may appear in place of the bottle.

Next, an actuator and a speaker output effects associated with the opening of a bottle 1506. In some embodiments, the audio and haptic effects may be effects associated with a cork popping. In other embodiments, the effects may be associated with the pouring of a beverage.

Then, a sensor 114 receives a user input that the pouring is completed 1508. In some embodiments, the sensor 114 may be an accelerometer, gyroscope, GPS or other sensor capable of sensing motion. In other embodiments, the sensor 114 may be a touch-screen or a track-ball 122. In some embodiments, the user input may comprise tilting the mobile device. In other embodiments the user input may comprise a gesture on the touch-screen display or a gesture made with the track-ball 122.

Next, the processor 110 transmits a signal to the display which causes the display to show a champagne glass 1510. In some embodiments the signal may cause the display to show a beer stein or other glass. In other embodiments, the signal may cause the display to show a bottle associated with some other type of beverage.

Then, a sensor 114 receives an input indicating the touching of glasses 1512. In some embodiments, the sensor 114 may be an accelerometer, gyroscope, GPS or other sensor capable of sensing motion. In other embodiments, the sensor 114 may be a touch-screen or a track-ball 122. In some embodiments the input may comprise raising the mobile device as though it is a glass of champagne in a toast. In other embodiments the input may be a gesture made on the touch-screen display.

Next, the processor 110 transmits a signal to the display, actuator and speakers associated with a toast 1514. In some embodiments the signal may comprise a visual signal associated with glasses touching, and audio and haptic signals associated with the light clink of two crystal glasses. In other embodiments the effects may be associated with different types of glassware. For example, the signal may comprise a visual signal associated with two heavy beer steins, and audio and haptic signals associated with heavy glasses impacting each other.

In one embodiment, a user may establish a direct virtual connection between two mobile devices by connecting both devices with a virtual rope. Devices mimicking the behavior of a real rope may cause vibrations that are reminiscent of those emitted by ropes when they are slackened and taught with tugging gestures.

Figures 16A, 16B, 16C:
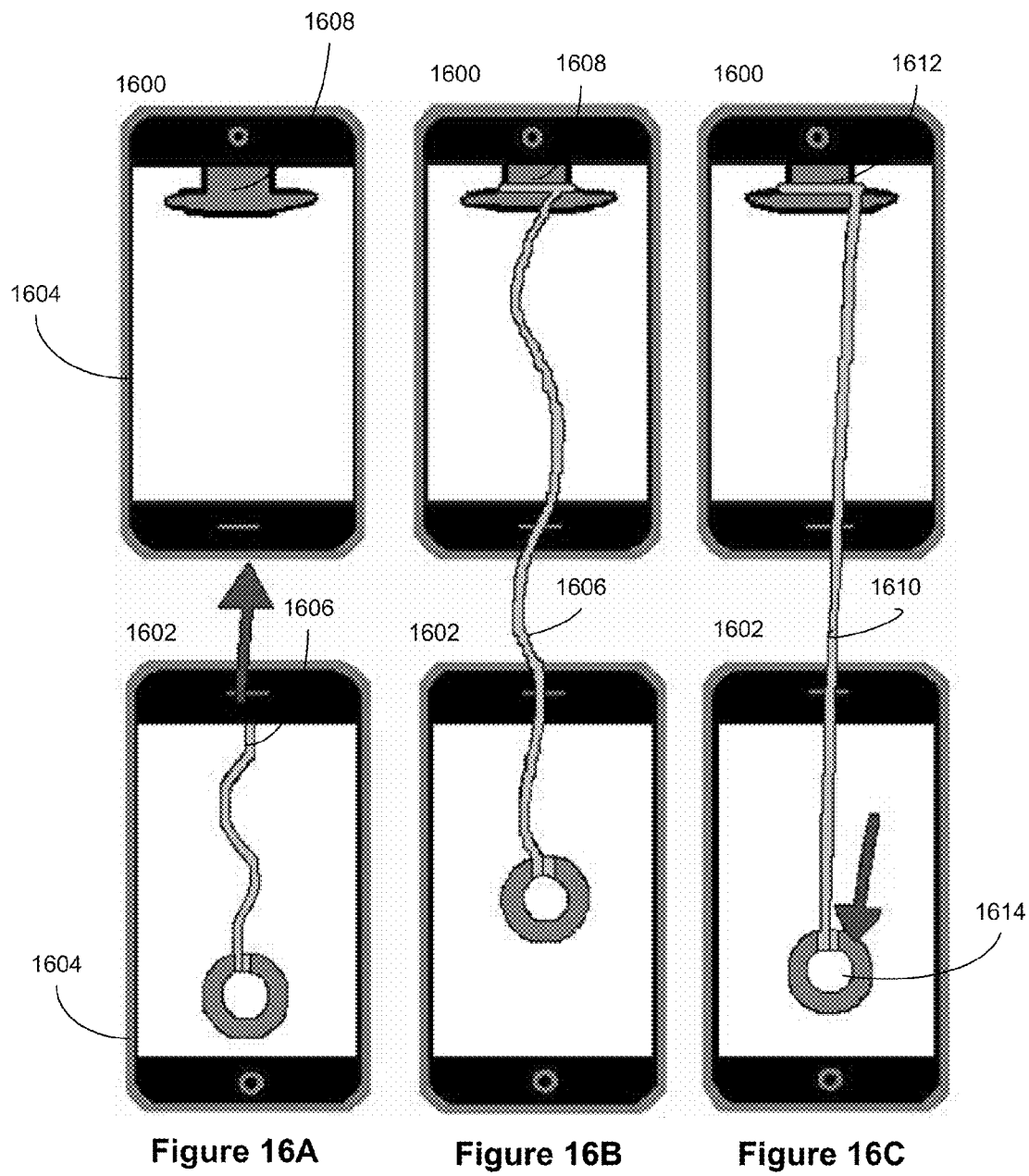
FIGS. 16a, 16b, and 16c are illustrations of transmitting haptic messages according to one embodiment of the present invention.

FIGS. 16a, 16b, and 16c are illustrations of transmitting haptic messages according to one embodiment of the present invention. In FIG. 16a, a mobile device 1600 is in communication with mobile device 1602. Each mobile device comprises a display 1604. Initially, mobile device 1602 comprises one end of a tug rope 1606, the rope attached to a pull or tug at one end, and unattached at the other end. Mobile device 1600 initially comprises an empty anchor. In order to initiate a connection, a user of mobile device 1600 may toss one end of the rope toward another user. For example, in one embodiment, the user may open a virtual gateway to the recipient mobile device, and flick the end of the rope in the direction of the virtual gateway. In another embodiment, the user may throw the rope by jerking the entire mobile device in the direction of the virtual gateway. The virtual tug rope may span the entire virtual space between the two devices, and ultimately arrive at mobile device 1600. In some scenarios, the virtual rope may not be able to span the length of the virtual space between the devices. For example, the mobile device 1600 may be too far way (such as in a different area code, state, or country) for the virtual rope to arrive. Alternatively, a user of the a mobile device may update a status such that certain virtual objects are automatically blocked.

When the rope appears on the display of mobile device 1600, the mobile device may generate a haptic and/or sound effect mimicking a rope landing in the virtual environment of the mobile device. Through such non-visual cues, mobile device 1600 may alert the user that a virtual tug rope has been tossed in their direction, without the user being required to look at the mobile device.

The user of the mobile device 1600 may catch the virtual tug rope. In some embodiments, the user may catch the tug rope by moving the mobile device in a catching gesture, such as a quick twirl of the communication device, or by pressing a specific button. In some embodiments, if the user of mobile device 1600 is not paying attention, they will not catch the rope and establish the connection. When the rope is not caught by a receiving device, the sending user may tug the virtual rope to have it come flying back into their mobile device, indicating that the connection has not been established. However, if the receiving user does see, feel and/or hear the rope arrive, they may catch the rope and secure it to their device.

In FIG. 16*b*, the user of mobile device 1600 has caught the virtual tug rope 1606 sent be mobile device 1602. And the user has secured virtual tug rope 1606 to a virtual anchor 1608. The users of mobile devices 1600 and 1602 now share the same virtual physical object which spans across their shared virtual physical space.

In FIG. 16*c*, the user of mobile device 1602 may yank or tug on the virtual tug rope, which may cause mobile device 1600 to generate a haptic effect mimicking the results of a taught rope 1610 pulling on anchor 1612. In response the user of mobile device 1600 may tug on the rope, which may cause mobile device to generate a haptic effect corresponding to the taught rope 1610 pulling on anchor 1614.

Figure 17:
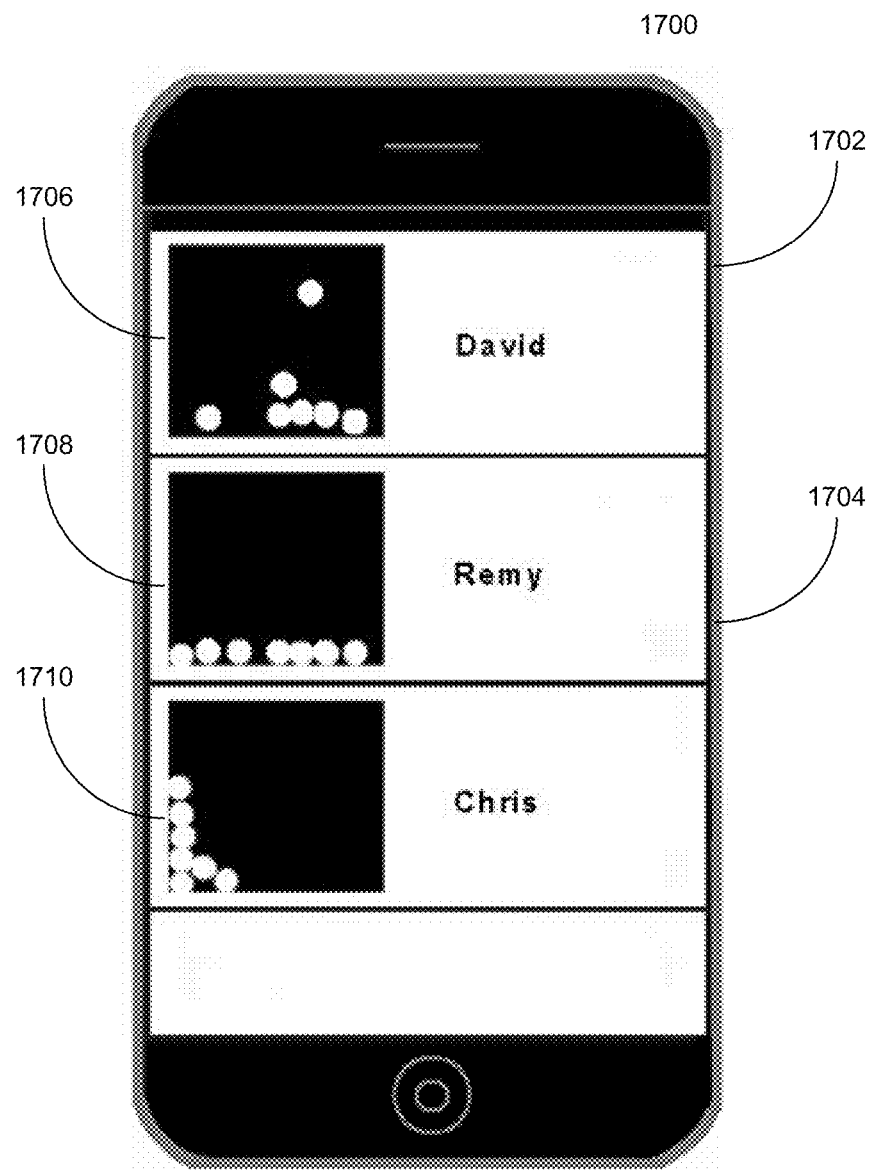
FIG. 17 is an illustration of transmitting haptic messages according to one embodiment of the present invention.

In other embodiment of the present invention, a user may form a real-time link to transmit information in a format other than a message. FIG. 17 is an illustration of transmitting haptic messages according to one embodiment of the present invention. As shown in FIG. 17, a mobile device 1700 comprises a display 1702. Display 1702 comprises a haptic contact list 1704. Each contact comprises a name and a haptic status shown in a haptic window. In one embodiment, when a user of mobile device 1700 touches the haptic status window of a contact, the user may feel a haptic effect corresponding to the status of the person listed in the haptic contact list. In a further embodiment, the mobile device may transmit a signal to the mobile device of the person listed in the haptic contact list. The signal may comprise a haptic signal to alert the person in the haptic contact list that someone is interested in their status. For example, while a first user swipes their finger across a second user's contact entry, the first user feels the second user's status. At the same time, the swipe gesture by the first user is transmitted to the second user's device, which may generate a haptic effect perceptually equivalent or similar to the duration and intensity of the finger swipe. In another embodiment, the first user may tap repeatedly on the second user's contact list entry, mimicking knocking on a door or window, which transmits a haptic, audio, and visual knocking effect to the second user, serving as an invitation to initiate a communication session.

In another embodiment, as the user moves mobile device 1700, the mobile device's processor 110 may determine a motion profile based at least in part on sensor signals received from a sensor 114. In some embodiments the sensor 114 may comprise a GPS sensor, accelerometer, or other sensor capable of detecting movement or location. Then, the processor 110 may transmit the user's motion profile to other mobile devices which list the user in their haptic contact list. The contact list on each communications device may be updated with the user's motion profile in real-time, so that a user may be able to determine the current activity of a person on their contact list by looking at their haptic status window.

In FIG. 1700, the haptic status of the first contact, David, is shown as a jumbled display of dots with no particular pattern 1706. This may indicate that David's communication device is in motion, possibly indicating that David is walking. The haptic status of the second contact, Remy, is represented as a stable, horizontal line 1708. This may indicate that Remy is sitting still, or alternatively, that the mobile device has been laid flat on a table. The haptic status of the third contact, Chris, is represented as a relatively flat vertical line 1710. This may indicate that Chris is holding the mobile device in an upright position. In some embodiments, the haptic status of each contact may be deliberately vague, so as to provide some privacy to each user while providing other users some information regarding their status.

Although FIG. 17 depicts the contact list with several entries on a single page, other variations are possible. For instance, each contact may have their own dedicated page, screen, or virtual object. Zooming in on an individual contact may provide the user with a more accurate view of that contact's status. Although haptic contact list 1704 depicts each contact's status as a box full of balls, other methods for displaying status may be utilized. For instance, the haptic inbox may use icons such as a heart representing fast movement, a sleeping icon representing no movement, or other graphics to provide status information for each contact.

Figure 18:
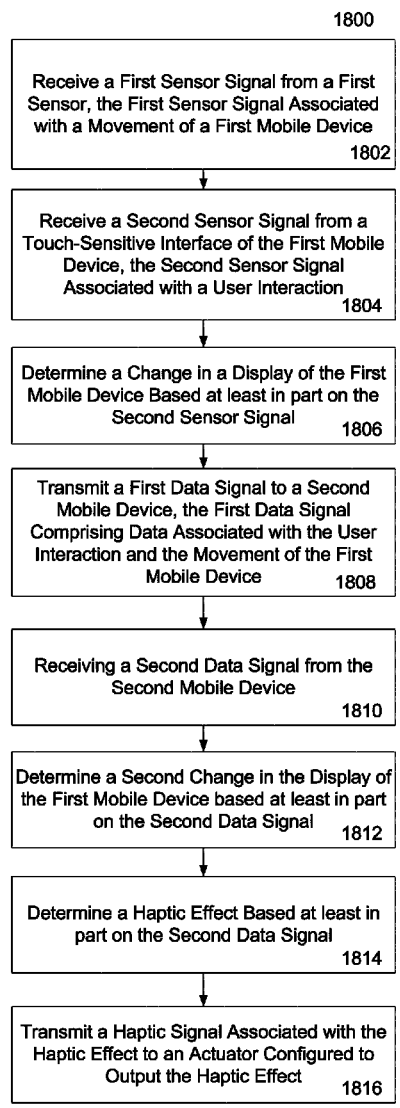
FIG. 18 is a flow chart illustrating a process of transmitting haptic messages according to one embodiment of the present invention.

FIG. 18 is a flow chart illustrating a process of transmitting haptic messages according to one embodiment of the present invention. Process 1800 begins when processor 110 receives a first sensor signal from a first sensor 114, the first sensor signal associated with a movement of the mobile device 1802. In some embodiments, the sensor 114 may be an accelerometer, gyroscope, GPS or other sensor capable of sensing motion. In some embodiments, the user gesture may comprise moving the mobile device in a predefined pattern. For example, in one embodiment the user gesture may comprise tilting the mobile device like a champagne bottle. In another example, the user gesture may comprise a movement substantially approximating the shape of a heart. In another embodiment, the user gesture may comprise pounding the mobile device like a hammer. In still another embodiment, the user gesture may comprise tossing or flipping a rope.

Next, processor 110 receives a second sensor signal from a touch-sensitive interface of the first mobile device, the second sensor signal associated with a user interaction 1804. In some embodiments, display 116 may comprise a touch-sensitive interface such as a touch-screen display. In other embodiments, the touch-sensitive interface may comprise track-ball 122. In some embodiments, the user interaction may comprise a user interaction with a graphical user interface shown on display 116. In such an embodiment, the user interaction may comprise double-tapping a portion of the graphical user interface. In another embodiment, the user interaction may comprise entering text which is appended to a virtual message object. In other embodiments, the user interaction may comprise finger painting on the surface of the touch-screen display.

Then, processor 110 determines a change in a display 116 of the first mobile device, based at least in part on the second sensor signal 1806. In some embodiments, the change may comprise displaying a trail which follows the user's finger as it moves across the surface of the touch-screen display. In other embodiments, the change in the display may comprise modifying a virtual object on the display. For example, the display may comprise an image, and the user interaction may comprise modifications to the image. In other embodiments, the change in the display may comprise displaying a new virtual object, such as bubbles, a heart, a nail, a rope, or a champagne bottle.

Next, the processor 110 transmits a first data signal to a second mobile device, the first data signal comprising data associated with the user interaction and the movement of the first mobile device 1808. In some embodiments, processor 110 may transmit the data signal via network interface 112. In some embodiments, the processor 110 transmits the first data signal substantially simultaneously to receiving user input via the touch-sensitive interface. In other embodiments, the processor 110 does not transmit the data signal until receiving a user interaction indicating the processor 110 should transmit.

Then, the processor 110 receives a second data signal from the second mobile device 1810. In some embodiments, the processor 110 may receive the data signal from network interface 112. In some embodiments, the processor 110 transmits data signals to the second mobile device, and substantially simultaneously receives a signal from the second mobile device. In some embodiments, the second data signal comprises data corresponding to a user interaction with a touch-sensitive interface with the second mobile device.

Next, processor 110 determines a second change in the display of the first mobile device based at least in part on the second data signal 1812. In some embodiments, the received data may correspond to a change on the display of the second mobile device. In such an embodiment, the change to the display of the first mobile device determined by processor 110 may correspond to the change in the display of the second mobile device. For example, the user of the second mobile device may move their finger across the second mobile device to draw a picture. The second mobile device may then transmit a corresponding second signal to the first mobile device. The processor 110 of the first mobile device may then modify its display in a way that substantially correspond to the display of the second mobile device. In another embodiment, the user of the second mobile device may modify a picture on their touch-screen display. In such an embodiment, the second user's modifications will appear substantially simultaneously on the display of the first mobile device.

Then, processor 110 determines a haptic effect based at least in part on the second data signal 1814. For example, in one embodiment the second data signal may comprise information to corresponding to the user of the second mobile device tapping the surface of the second mobile device. In such an embodiment, the processor 110 may determine a haptic effect corresponding to the tapping. In another example, a user interaction with the first mobile device may cross substantially the same position as the second user's interaction with the second mobile device. In such an embodiment, the determined haptic effect may substantially correspond to an impact between the user of the first and the second mobile device. In another embodiment the second data signal may correspond to opening a virtual bottle on the second mobile device. In such an embodiment the determined haptic effect may correspond to a cork popping on the bottle.

Finally, the processor 110 transmits a haptic signal associated with the haptic effect to an actuator 118 configured to output the haptic effect. In some embodiments Actuator 118 may be, for example, a piezoelectric actuator, an electric motor, an electro-magnetic actuator, a voice coil, a linear resonant actuator, a shape memory alloy, an electro-active polymer, a solenoid, an eccentric rotating mass motor (ERM) or a linear resonant actuator (LRA).

Computer Readable Medium for Transmitting Haptic Messages

Embodiments of the present invention can be implemented in digital electronic circuitry, or in computer hardware, firmware, software, or in combinations of these technologies. In one embodiment, a computer may comprise a processor or processors. The processor comprises a computer-readable medium, such as a random access memory (RAM) coupled with the processor. The processor executes computer-executable program instructions stored in memory, such as executing one or more computer programs for messaging. Such processors may comprise a microprocessor, a digital signal processor (DSP), an application-specific integrated circuit (ASICs), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise or be in communication with media, for example computer-readable media, which stores instructions that, when executed by the processor, cause the processor to perform the steps described herein as carried out or facilitated by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor and the processing described may be in one or more structures and may be dispersed through one or more structures. The processor may comprise a code for carrying out one or more of the methods (or parts of methods) described herein.

General

The foregoing description of the embodiments, including preferred embodiments, of the invention has been presented only for the purpose of illustration and description and is not intended to be exhaustive nor to limit the invention to the precise forms disclosed. Numerous modifications and adaptations thereof will be apparent to those skilled in the art without departing from the spirit and scope of the invention.

That which is claimed is:

1. A method comprising:
   receiving at least one sensor signal from at least one sensor of a mobile device, the at least one sensor signal associated with a movement of the mobile device;
   determining a message to be displayed in a user interface based at least in part on the at least one sensor signal;
   determining a haptic effect based in part on the first sensor signal; and
   causing the message to be displayed and the haptic effect to be output.

2. The method of claim 1, wherein the at least one sensor comprises one or more of: an accelerometer, a gyroscope, a touch-sensitive input device, a camera, or a GPS sensor.

3. The method of claim 1, wherein the at least one sensor comprises a plurality of sensors.

4. The method of claim 3, wherein a first sensor of the plurality of sensors comprises an accelerometer and a second sensor of the plurality of sensors comprises a touch-screen.

5. The method of claim 1, wherein the message comprises predefined characteristics.

6. The method of claim 5, wherein the predefined characteristics comprise: a shape and a haptic effect.

7. The method of claim 1, wherein:
the movement of the mobile device comprises a movement approximating the shape of a heart; and
the message is in the form of a heart.

8. The method of claim 1, wherein:
the movement of the mobile device comprises a movement approximating a hammering motion; and
the message is in the form of a nail.

9. The method of claim 1, further comprising detecting a user interaction associated with the message.

10. The method of claim 9, wherein the user interaction comprises an input on a touch-sensitive input device of the mobile device.

11. The method of claim 9, wherein the user interaction comprises tilting the mobile device.

12. The method of claim 9, wherein the user interaction comprises an input detected by a microphone of the mobile device.

13. The method of claim 12, wherein the user interaction comprises blowing on the microphone.

14. The method of claim 9, further comprising transmitting a signal associated with the message to a recipient.

15. A method comprising:
receiving a first sensor signal from a first sensor, the first sensor signal associated with a movement of a first mobile device;
receiving a second sensor signal from a touch-sensitive interface of the first mobile device, the second sensor signal associated with a user interaction;
determining a change in a display of the first mobile device based at least in part on the second sensor signal;
transmitting a first data signal to a second mobile device, the first data signal comprising data associated with the user interaction and the movement of the first mobile device; and
determining a haptic effect based at least in part on the first data signal and outputting the haptic effect.

16. The method of claim 15, wherein the touch-sensitive interface comprises a touch-screen display.

17. The method of claim 15, wherein the determining a change in the display of the first mobile device and the transmitting a data signal to a second mobile device occur substantially simultaneously.

18. The method of claim 15, wherein the change in the display of the first mobile device comprises displaying a trail substantially following the location of a point of contact between the user and the device.

19. The method of claim 15, wherein the movement of the first mobile device comprises a movement substantially approximating a pouring gesture.

20. The method of claim 19, wherein the change in the display comprises displaying a champagne bottle.

21. The method of claim 15, further comprising:
receiving a second data signal from the second mobile device;
determining a second change in the display of the first mobile device based at least in part on the second data signal.

22. The method of claim 21, wherein the second data signal comprises data corresponding to a display of the second mobile device.

23. The method of claim 21, wherein the change in the display of the first mobile device comprises outputting an image substantially the same as the display of the second mobile device.

24. The method of claim 21, further comprising:
determining a haptic effect based at least in part on the second data signal; and
transmitting a haptic signal associated with the haptic effect to an actuator configured to output the haptic effect.

25. The method of claim 24, wherein the haptic effect comprises a haptic effect approximating a champagne cork popping.

26. The method of claim 24, wherein the haptic effect comprises a haptic effect approximating a collision between a user of the first mobile device and a user of the second mobile device.

27. A system comprising:
a processor configured to:
receive a first sensor signal from a first sensor, the first sensor configured to detect a movement of a first mobile device;
receive a second sensor signal from a second sensor, the second sensor configured to detect an interaction with the first mobile device;
receive a first data signal from a network interface, the network interface configured to receive signals transmitted by a second mobile device;
determine a change in a display signal based at least in part on the first data signal and the second sensor signal;
determine a haptic effect based at least in part on the first data signal; and
outputting the haptic effect.

28. The system of claim 27, wherein the first sensor and the second sensor are each configured to detect one or more of: contact, pressure, acceleration, inclination, inertia, or location.

29. The system of claim 27, wherein the second sensor comprises a touch-screen.

30. The system of claim 27, wherein the mobile device further comprises a speaker configured to generate a sound effect coordinated with the haptic effect.

31. The system of claim 27, wherein the processor is further configured to transmit a second data signal to the network interface, and the network interface is further configured to transmit the second data signal to the second mobile device.

* * * * *